United States Patent
Kimura

(10) Patent No.: US 9,854,539 B2
(45) Date of Patent: Dec. 26, 2017

(54) RADIO COMMUNICATION DEVICE, RADIO COMMUNICATION SYSTEM AND BEAM CONTROL METHOD

(71) Applicant: FUJITSU LIMITED, Kawasaki-shi, Kanagawa (JP)

(72) Inventor: Dai Kimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/418,334

(22) Filed: Jan. 27, 2017

(65) Prior Publication Data
US 2017/0230910 A1   Aug. 10, 2017

(30) Foreign Application Priority Data
Feb. 8, 2016   (JP) ................... 2016-021491

(51) Int. Cl.
| | | |
|---|---|---|
| H04B 7/06 | (2006.01) | |
| H04W 52/24 | (2009.01) | |
| H04B 17/345 | (2015.01) | |
| H04L 12/26 | (2006.01) | |
| H04W 68/12 | (2009.01) | |

(52) U.S. Cl.
CPC ........ *H04W 52/243* (2013.01); *H04B 7/0617* (2013.01); *H04B 17/345* (2015.01); *H04L 43/16* (2013.01); *H04W 68/12* (2013.01)

(58) Field of Classification Search
CPC ............................ H04B 7/0617; H04B 7/0695
USPC .......... 455/550.1, 501, 73, 277.1, 275, 561, 455/562.1, 67.11, 67.13
See application file for complete search history.

(56) References Cited

U.S. PATENT DOCUMENTS

| | | | |
|---|---|---|---|
| 5,606,727 A | 2/1997 | Ueda | |
| 9,614,594 B2 * | 4/2017 | Kim | .............. H04B 7/0408 |
| 2002/0168946 A1 * | 11/2002 | Aizawa | .............. H04B 7/0617 |
| | | | 455/82 |
| 2005/0276242 A1 | 12/2005 | Goto et al. | |
| 2010/0014463 A1 * | 1/2010 | Nagai | .............. H04B 7/0695 |
| | | | 370/328 |
| 2011/0085448 A1 | 4/2011 | Kuwahara | |

FOREIGN PATENT DOCUMENTS

| | | |
|---|---|---|
| JP | 7-184254 A | 7/1995 |
| JP | 2001-127699 A | 5/2001 |
| JP | 2005-252886 A | 9/2005 |
| JP | 2010-109745 A | 5/2010 |
| JP | 2011-087009 A | 4/2011 |

* cited by examiner

*Primary Examiner* — John J Lee
(74) *Attorney, Agent, or Firm* — Arent Fox LLP

(57) ABSTRACT

A radio communication device including a memory that stores information on a strength of interference between a beam output by a first base station and a beam output by a second base station for each of a plurality of combinations, each of the plurality of combinations including at least one of a plurality of beams output by the first base station and at least one of a plurality of beams output by the second base station, emitting directions of each of the plurality of beams output by the first base station being different each other, emitting directions of each of the plurality of beams output by the second base station being different each other, and a processor configured to identify one or more combinations having the interference strength higher than a threshold, and assign different radio resources to each of beams included in the identified one or more combinations.

6 Claims, 18 Drawing Sheets

FIG. 1
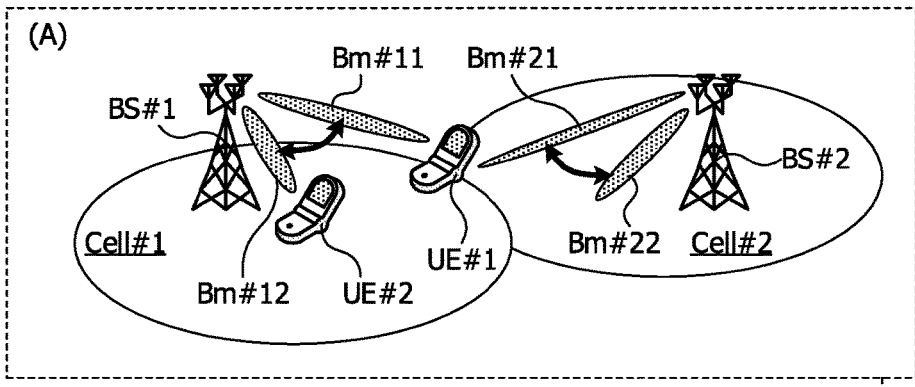
(A)
(B) INFORMATION ON STRENGTHS OF INTERFERENCE
| RADIO TERMINAL | BEAM | | INTERFERENCE STRENGTH |
|---|---|---|---|
| | BS#1 | BS#2 | |
| UE#1 | Bm#11 | Bm#21 | 10 |
| | Bm#11 | Bm#22 | 2 |
| | Bm#12 | Bm#21 | 4 |
| | Bm#12 | Bm#22 | 0 |
| UE#2 | Bm#11 | Bm#21 | 6 |
| | Bm#11 | Bm#22 | 1 |
| | Bm#12 | Bm#21 | 2 |
| | Bm#12 | Bm#22 | 0 |
⇩ THRESHOLD VALUE Th = 5 (AVERAGE)
(C) ASSIGNMENT OF RADIO RESOURCES
| BASE STATION | BEAM | RADIO RESOURCE |
|---|---|---|
| BS#1 | Bm#11 | Rs#1 |
| BS#2 | Bm#21 | Rs#2 |
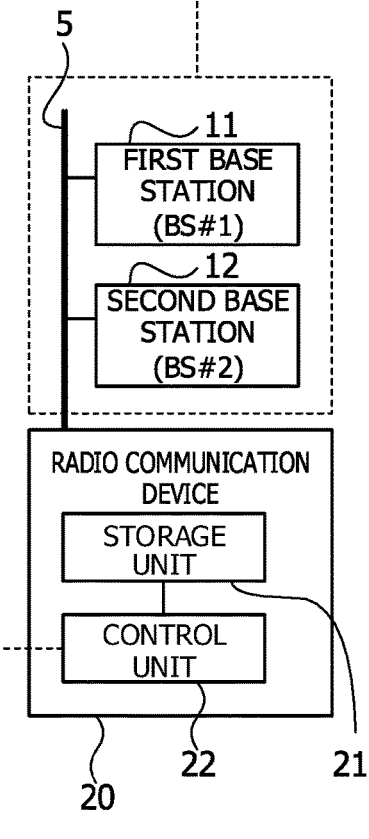
1

| TIME | BEAM | | |
|------|------|------|------|
|      | BS#1 | BS#2 | BS#3 |
| Ts1  | Bm#11 | - | - |
| Ts2  | - | Bm#21 | - |
| Ts3  | - | - | Bm#31 |
| Ts4  | Bm#12 | - | - |
| Ts5  | - | Bm#22 | - |
| Ts6  | - | - | Bm#32 |

FIG. 10

| 211b | |
|---|---|
| BEAM | RESOURCE |
| Bm#11 | Rs#1 |
| Bm#12 | Rs#2 |

FIG. 12

| GROUP | BEAM | | |
|---|---|---|---|
| | BS#1 | BS#2 | BS#3 |
| G#1 | Bm#11 | Bm#22 | - |
| | Bm#12 | Bm#21 | - |
| G#2 | Bm#11 | - | Bm#31 |
| G#3 | - | Bm#22 | Bm#31 |
| G#4 | - | - | Bm#32 |

| BEAM | | RESOURCE |
|---|---|---|
| BS#1 | Bm#11 | Rs#1 |
| | Bm#12 | Rs#1 |
| BS#2 | Bm#21 | Rs#2 |
| | Bm#22 | Rs#2 |
| BS#3 | Bm#31 | Rs#3 |
| | Bm#32 | Rs#1 - Rs#3 |

RADIO COMMUNICATION DEVICE, RADIO COMMUNICATION SYSTEM AND BEAM CONTROL METHOD

CROSS-REFERENCE TO RELATED APPLICATION

This application is based upon and claims the benefit of priority of the prior Japanese Patent Application No. 2016-021491, filed on Feb. 8, 2016, the entire contents of which are incorporated herein by reference.

FIELD

The embodiments discussed herein are related to a radio communication device, a radio communication system, and a beam control method.

BACKGROUND

In a radio communication system using high frequencies as in millimeter wave communication, beamforming that concentrates power by narrowing a beam in the direction of a user terminal may be performed to compensate for a propagation loss. When beamforming is performed, beams are narrowed in specific directions in which user terminals are present, and therefore areas where high-power signal can be received may be spatially isolated from each other, thus providing an effect of suppressing interference between the user terminals present in a same space. In addition, frequency usage efficiency may be increased due to an improvement in a degree of spatial multiplexing.

Interference between user terminals present within a same cell may be reduced by thus performing beamforming. However, beam interference between adjacent cells (inter-cell interference) may occur. As a measure against inter-cell interference, a coordinated beamforming (CB) system is proposed which obtains information on a user terminal from a base station of an adjacent cell, and controls a beam so as to direct NULL (direction of the beam in which power is minimized) to the user terminal in the adjacent cell.

Incidentally, a technology is proposed which weakens transmission power for user terminals located in the vicinity of a base station, and for user terminals located in the vicinities of cell boundaries, controls frequency allocation such that frequency differs between the user terminals in adjacent beam areas. In addition, a satellite communication system is proposed which sets a plurality of regions (beam areas) on the ground in which regions radio terminals may communicate via a beam output by a satellite, and assigns different frequency bands to adjacent beam areas.

CITATION LIST

Patent Documents

[Patent Document 1]
Japanese Laid-open Patent Publication No. 2010-109745
[Patent Document 2]
Japanese Laid-open Patent Publication No. 2011-087009

SUMMARY

According to an aspect of the embodiments, a radio communication device including a memory that stores information on a strength of interference between a beam output by a first base station and a beam output by a second base station for each of a plurality of combinations, each of the plurality of combinations including at least one of a plurality of beams output by the first base station and at least one of a plurality of beams output by the second base station, emitting directions of each of the plurality of beams output by the first base station being different each other, emitting directions of each of the plurality of beams output by the second base station being different each other, and a processor coupled to the memory and the processor configured to identify one or more combinations having the interference strength higher than a threshold value among the plurality of combinations, and assign different radio resources to each of beams included in the identified one or more combinations.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of a radio communication system according to a first embodiment;

FIG. 9 is a diagram illustrating an example of cooperative control information according to the second embodiment;

FIG. 10 is a diagram illustrating an example of resource information (base station) according to the second embodiment;

FIG. 12 is a diagram illustrating an example of group information according to the second embodiment;

FIG. 13 is a diagram illustrating an example of resource information (control station) according to the second embodiment;

DESCRIPTION OF EMBODIMENTS

Figure 2:
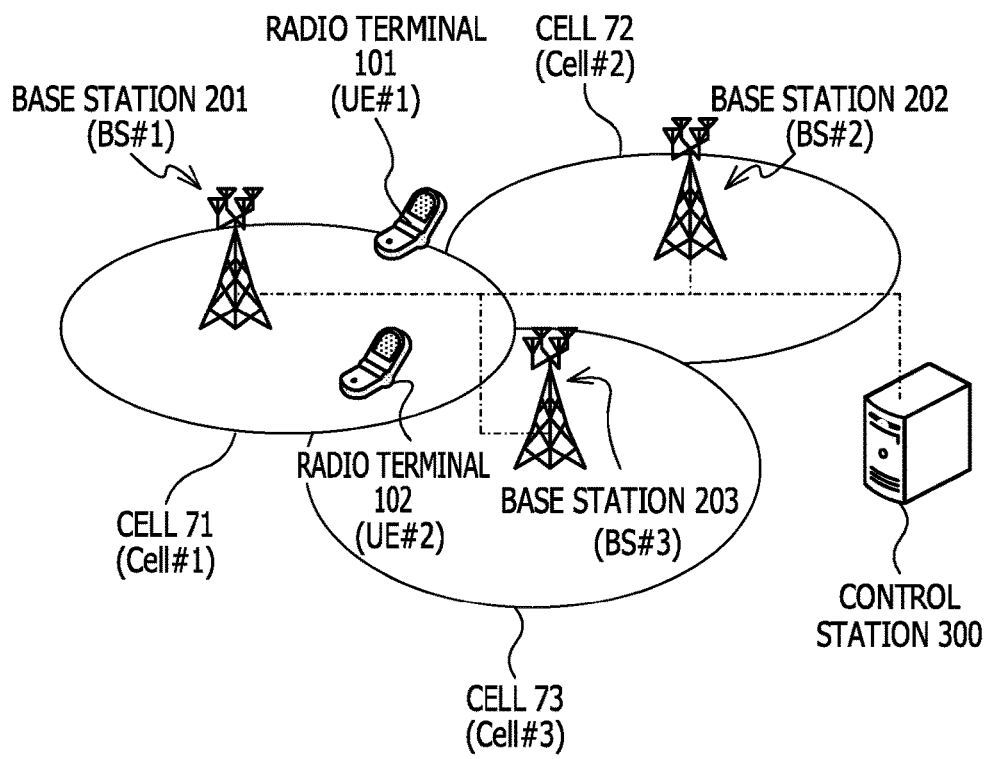
FIG. 2 is a diagram illustrating an example of a radio communication system according to a second embodiment.

In a case where the CB system is applied, a plurality of base stations controlling beams may each use user information related to user terminals in adjacent cells. For example, each base station may calculate beamforming weights in consideration of channel information related to a user terminal in an adjacent cell in order to direct NULL to the user terminal. Therefore, the base stations may be coupled to each other by high-speed communication interfaces, and the user information of the adjacent cells may be transmitted and received between the base stations when beamforming is performed.

Inter-cell interference may be suppressed by applying the CB system. However, processing loads may not be insignificant which are involved in the transmission and reception of the user information, which is performed between the base stations each time beamforming is performed, and the calculation of the beamforming weights. When inter-cell interference may be suppressed by beamforming not using the user information of the adjacent cells, it may contribute to reduction in such processing loads. In addition, when the high-speed communication interfaces may be omitted, it may contribute to reduction in cost involved in system introduction and operation management.

According to one aspect, it is an object of the present disclosure to provide a radio communication device, a radio communication system, and a beam control method that may reduce user information obtained from base stations in adjacent cells in order to suppress inter-cell interference at a time of beamforming.

Embodiments of the present technology will be described in the following with reference to the accompanying drawings. Incidentally, repeated description of elements having essentially identical functions in the present specification and the drawings may be omitted by identifying the elements by the same reference symbols.

1. First Embodiment

A first embodiment will be described with reference to FIG. 1. FIG. 1 is a diagram illustrating an example of a radio communication system according to the first embodiment. A radio communication system 1 illustrated in FIG. 1 is an example of the radio communication system according to the first embodiment.

The first embodiment relates to a technology that realizes beamforming effective in suppressing inter-cell interference. The CB system adopts a method of calculating beamforming weights so as to direct NULL toward a user terminal in an adjacent cell, using channel information related to the user terminal, and suppressing inter-cell interference by beamforming. The first embodiment, on the other hand, provides a method of suppressing the inter-cell interference without considering the channel information related to the user terminal in the adjacent cell at a time of beamforming.

The above-described adjacent cell refers to another cell positionally adjacent to a certain cell. However, an adjacent cell referred to herein includes a micro cell covering a relatively small area and located in a macro cell covering a wide area. For example, in the following, relation between a macro cell and a micro cell located in the macro cell may be referred to as adjacency of the cells for the convenience of description.

As illustrated in FIG. 1, the radio communication system 1 includes a first base station 11, a second base station 12, and a radio communication device 20. The first base station 11 and the second base station 12 are coupled to the radio communication device 20 via a communication line 5.

Incidentally, while description will be made by taking, as an example, the two base stations adjacent to each other (the first base station 11 and the second base station 12) for the convenience of description, the number of base stations included in the radio communication system 1 may be three or more. In addition, description will be made by taking, as an example, a case where there are a first cell (Cell #1) and a second cell (Cell #2) illustrated in (A) in FIG. 1. In the present example, the first base station 11 (BS #1) forms Cell #1. The second base station 12 (BS #2) forms Cell #2. There are two radio terminals (UE #1 and UE #2) in Cell #1.

The first base station 11 performs beamforming. For example, the first base station 11 includes a plurality of antennas, and changes the direction of a beam by controlling the phase and power of radio waves output from the respective antennas. In the example of (A) in FIG. 1, the first base station 11 (BS #1) may switch a beam between beams Bm #11 and Bm #12 having different directions. Incidentally, while the number of beams to which switching may be performed is two for the convenience of description, the number of beams to which switching may be performed may be three or more.

The second base station 12 performs beamforming. For example, the second base station 12 includes a plurality of antennas, and changes the direction of a beam by controlling the phase and power of radio waves output from the respective antennas. In the example of (A) in FIG. 1, the second base station 12 (BS #2) may switch a beam between beams Bm #21 and Bm #22 having different directions. Incidentally, while the number of beams to which switching may be performed is two for the convenience of description, the number of beams to which switching may be performed may be three or more.

The radio communication device 20 includes a storage unit 21 and a control unit 22.

The storage unit 21 is a volatile storage device such as a random access memory (RAM) or a nonvolatile storage device such as a hard disk drive (HDD) or a flash memory. The control unit 22 is a processor such as a central processing unit (CPU) or a digital signal processor (DSP). However, the control unit 22 may be an electronic circuit such as an application specific integrated circuit (ASIC) or a field programmable gate array (FPGA). The control unit 22 may execute a program stored in the storage unit 21 or another memory.

The storage unit 21 stores information on the strengths of interference between beams output by the first base station 11 and beams output by the second base station 12.

For example, as illustrated in (B) in FIG. 1, the information on the interference strengths described above includes information indicating the strengths of interference between the beams measured in each radio terminal. In the example of (B) in FIG. 1, the interference strength corresponding to the combination of Bm #11 and Bm #21 with respect to UE #1 is ten. This indicates that the interference strength based on reception power values of Bm #11 output by BS #1 and Bm #21 output by BS #2, which reception power values are measured by UE #1, is ten.

Even in the case of the combination of the same beams, the measured interference strength may differ when measured by radio terminals at different positions. In the example of (B) in FIG. 1, an interference strength based on reception power values of Bm #11 output by BS #1 and Bm #21 output by BS #2, which reception power values are measured by UE #2, is six. Incidentally, while the interference strengths with respect to UE #1 and UE #2 are indicated individually in the present example, the storage unit 21 may store an average value obtained by averaging values indicating the interference strengths with respect to the radio terminals in association with the combination of the beams.

The control unit 22 identifies combinations of beams whose interference strengths are higher than a threshold value Th. The threshold value Th may be set in advance and stored in the storage unit 21, or may be set adaptively according to the number of identified combinations. For example, the threshold value Th may be set so as to minimize a difference between the number of identified combinations and the number of remaining combinations.

In the example of (B) in FIG. 1, the threshold value Th is set to five, and a combination of beams (Bm #11 and Bm #21) is identified whose average value obtained by averaging the values of the interference strengths with respect to the radio terminals is larger than the threshold value Th. It is thus possible to apply a method of identifying a combination of beams based on comparison between an average value and the threshold value Th, a method of identifying a combination of beams whose interference strength with respect to a given number of radio terminals (for example, one radio terminal) or more is higher than the threshold value Th, or the like.

The control unit 22 determines the assignment of radio resources such that different radio resources (frequency and time) are assigned to the beam of the first base station 11 and the beam of the second base station 12, the beams being included in the identified combination. In the example of (B) in FIG. 1, Bm #11 and Bm #21 are identified. Thus, as in (C) in FIG. 1, when a radio resource Rs #1 is assigned to Bm #11, a radio resource Rs #2 different from Rs #1 is assigned to Bm #21.

The control unit 22 notifies the first base station 11 and the second base station 12 of information on the radio resources assigned to the beams. For example, in the example of (C) in FIG. 1, the first base station 11 (BS #1) is notified of the identifying information of the beam Bm #11 of BS #1 which beam is included in the combination of the beams (Bm #11 and Bm #21) and information on the radio resource Rs #1 assigned to Bm #11. Meanwhile, the second base station 12 (BS #2) is notified of the identifying information of Bm #21 and information on the radio resource Rs #2 assigned to Bm #21.

When the first base station 11 (BS #1) having already received the above-described notification uses Bm #11 in beamforming, the first base station 11 (BS #1) assigns Rs #1 to a radio terminal to which Bm #11 is directed. On the other hand, when the second base station 12 (BS #2) having already received the above-described notification uses Bm #21 in beamforming, the second base station 12 (BS #2) assigns Rs #2 to a radio terminal to which Bm #21 is directed. When such assignment control is performed, there is a small interference between the beams even in conditions where Bm #11 and Bm #21 are used simultaneously. It is therefore possible to suppress inter-cell interference.

As described above, the first embodiment identifies a combination of beams that produce a strong effect of inter-cell interference when using the same radio resource, and assigns radio resources different from each other to the beams included in the combination.

According to the foregoing, each base station may obtain an effect of suppressing inter-cell interference by appropriately using radio resources assigned to respective beams. For example, it may be possible to suppress inter-cell interference even when channel information related to radio terminals in adjacent cells or the like is not obtained from base stations of the adjacent cells. Therefore, the user information of the adjacent cells may not need to be considered when beamforming weights are calculated, and the user information may not need to be transmitted and received at high speed between the base stations. This may consequently contribute to reduction in processing loads, reduction in cost involved in the installation and operation of high-speed communication interfaces, and the like.

The first embodiment has been described above.

2. Second Embodiment

A second embodiment will next be described. The second embodiment relates to a technology that realizes beamforming effective in suppressing inter-cell interference, and suppresses inter-cell interference without consideration given to channel information related to user terminals in adjacent cells at a time of beamforming.

[2-1. System]

A radio communication system according to the second embodiment will first be described with reference to FIG. 2. FIG. 2 is a diagram illustrating an example of the radio communication system according to the second embodiment. A radio communication system 50 illustrated in FIG. 2 is an example of the radio communication system according to the second embodiment.

As illustrated in FIG. 2, the radio communication system 50 includes radio terminals 101 and 102, base stations 201, 202, and 203, and a control station 300. The base station 201 forms a cell 71. The base station 202 forms a cell 72. The base station 203 forms a cell 73. In addition, the base stations 201, 202, and 203 and the control station 300 are coupled to each other by a communication line.

In the following, the radio terminal 101 may be denoted as UE #1, and the radio terminal 102 may be denoted as UE #2. In addition, the base station 201 may be denoted as BS #1, the base station 202 may be denoted as BS #2, and the base station 203 may be denoted as BS #3. In addition, the cell 71 may be denoted as Cell #1, the cell 72 may be denoted as Cell #2, and the cell 73 may be denoted as Cell #3. Incidentally, while the control station 300 is represented in the shape of a computer different from a base station in the example of FIG. 2, it is also possible to provide the base stations with the functions of the control station 300.

The base stations 201, 202, and 203 each include a plurality of antennas, and change the direction of a beam by controlling the phase and power of radio waves output from the respective antennas.

When the radio terminal 101 is present in the cell 71, for example, the base station 201 transmits a reference signal (RS) while selecting a plurality of beams, and receives, from the radio terminal 101, information on a beam from which a maximum reception power is measured. The base station 201 then transmits a data signal to the radio terminal 101 using the beam indicated by the information received from the radio terminal 101.

The base station 202 selects a beam based on beam information received from a radio terminal present in the cell 72, and transmits a data signal to the target radio terminal using the selected beam. The base station 203 selects a beam based on beam information received from a radio terminal present in the cell 73, and transmits a data signal to the target radio terminal using the selected beam.

Figure 3:
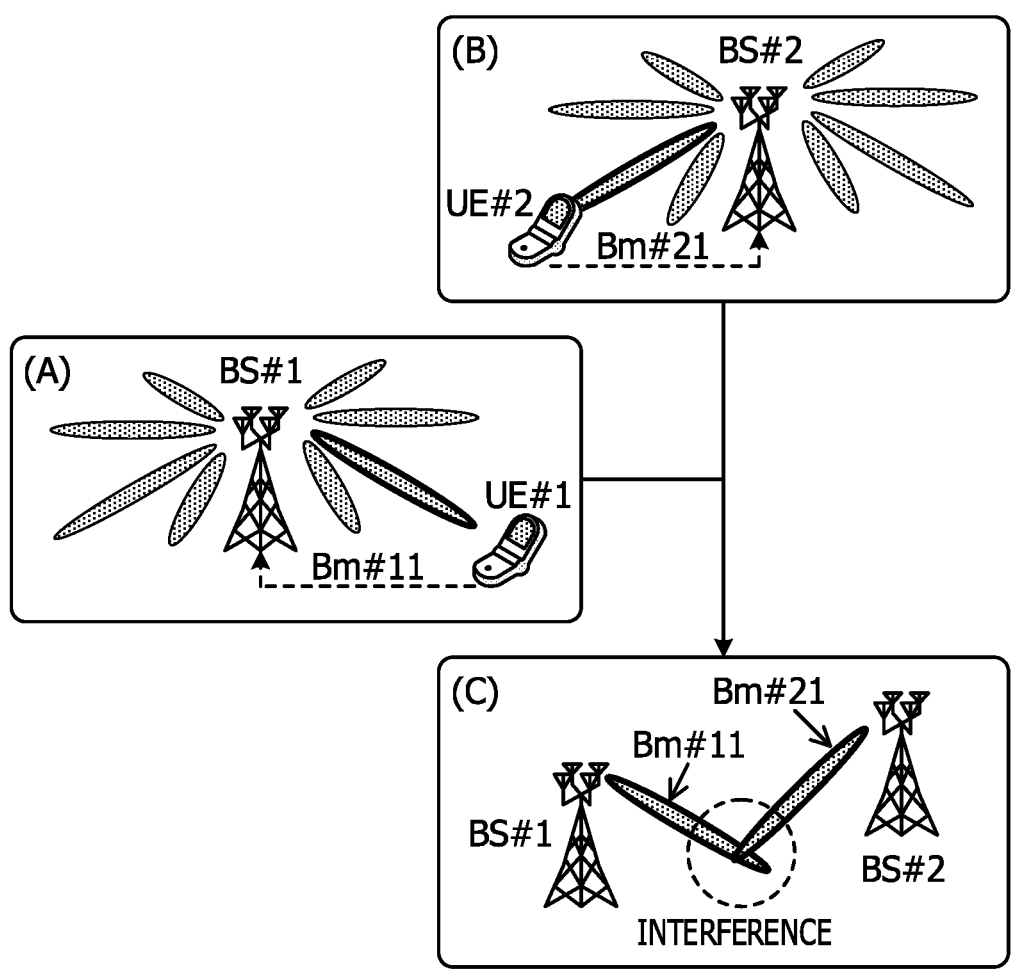
FIG. 3 is a diagram of assistance in explaining beamforming and inter-cell interference.

When the base stations 201, 202, and 203 each independently perform beamforming toward radio terminals within the cells in which the base stations 201, 202, and 203 themselves are located, as described above, inter-cell interference occurs as illustrated in FIG. 3. FIG. 3 is a diagram of assistance in explaining beamforming and inter-cell interference.

(A) in FIG. 3 illustrates a state in which the base station 201 (BS #1) receives information on a beam (Bm #11) corresponding to a maximum reception power from the radio terminal 101 (UE #1) present within the cell 71. (B) in FIG. 3 illustrates a state in which the base station 202 (BS #2) located in the cell 72 adjacent to the cell 71 receives information on a beam (Bm #21) corresponding to a maximum reception power from the radio terminal 102 (UE #2) present within the cell 72.

In a case where the two beams Bm #11 and Bm #21 strongly interfere with each other, desired signal quality may not be obtained even when beamforming is performed. Incidentally, this signal quality may be evaluated by a signal-to-interference plus noise power ratio (SINR), for example. The second embodiment accordingly provides a technology that suppresses inter-cell interference by assigning different radio resources (frequency and time) to beams that cause a strong interference between adjacent cells as in (C) in FIG. 3. Incidentally, the technology according to the second embodiment is applicable to both of an analog beamforming system and a digital beamforming system.

The radio communication system 50 has been described above. In the following, further description will be made of the radio terminals 101 and 102, the base stations 201, 202, and 203, and the control station 300.

[2-2. Hardware]

Description will first be made of hardware of the radio terminals 101 and 102, the base stations 201, 202, and 203, and the control station 300.

(Radio Terminal)

Figure 4:
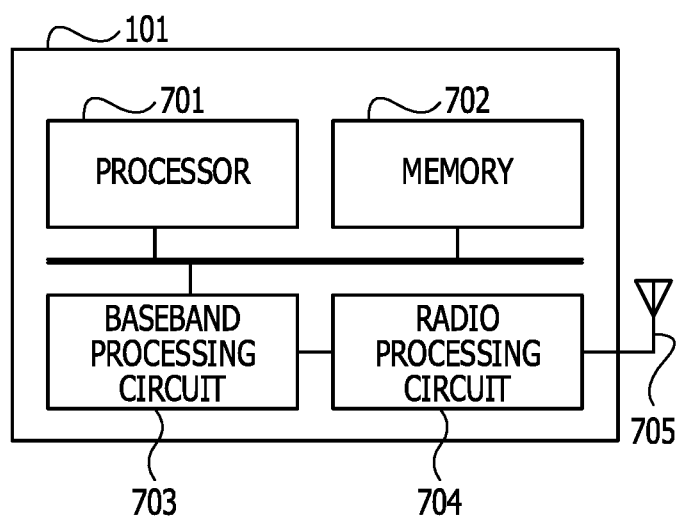
FIG. 4 is a diagram illustrating an example of hardware of a radio terminal according to the second embodiment.

Functions of the radio terminal 101 may be implemented by using hardware illustrated in FIG. 4, for example. Incidentally, hardware of the radio terminal 102 is the same as that of the radio terminal 101. FIG. 4 is a diagram illustrating an example of the hardware of the radio terminal according to the second embodiment.

As illustrated in FIG. 4, the radio terminal 101 includes a processor 701, a memory 702, a baseband processing circuit 703, a radio processing circuit 704, and an antenna 705.

The processor 701 is a processing circuit such as a CPU, a DSP, an ASIC or an FPGA. The memory 702 is a volatile storage device such as a RAM or a nonvolatile storage device such as an HDD or a flash memory. The baseband processing circuit 703 subjects baseband signals to processing such as error correction coding and decoding.

The radio processing circuit 704 generates a radio frequency (RF) signal by modulating a carrier wave based on a baseband signal output from the baseband processing circuit 703, and transmits the RF signal from the antenna 705. In addition, the radio processing circuit 704 demodulates a baseband signal from an RF signal received from the antenna 705, and inputs the baseband signal to the baseband processing circuit 703. Incidentally, suppose that the analog to digital (AD) and digital to analog (DA) conversions of the baseband signals are performed by the radio processing circuit 704. While the example of FIG. 4 is provided with one antenna 705, the number of antennas may be two or more.

(Base Station)

Figure 5:
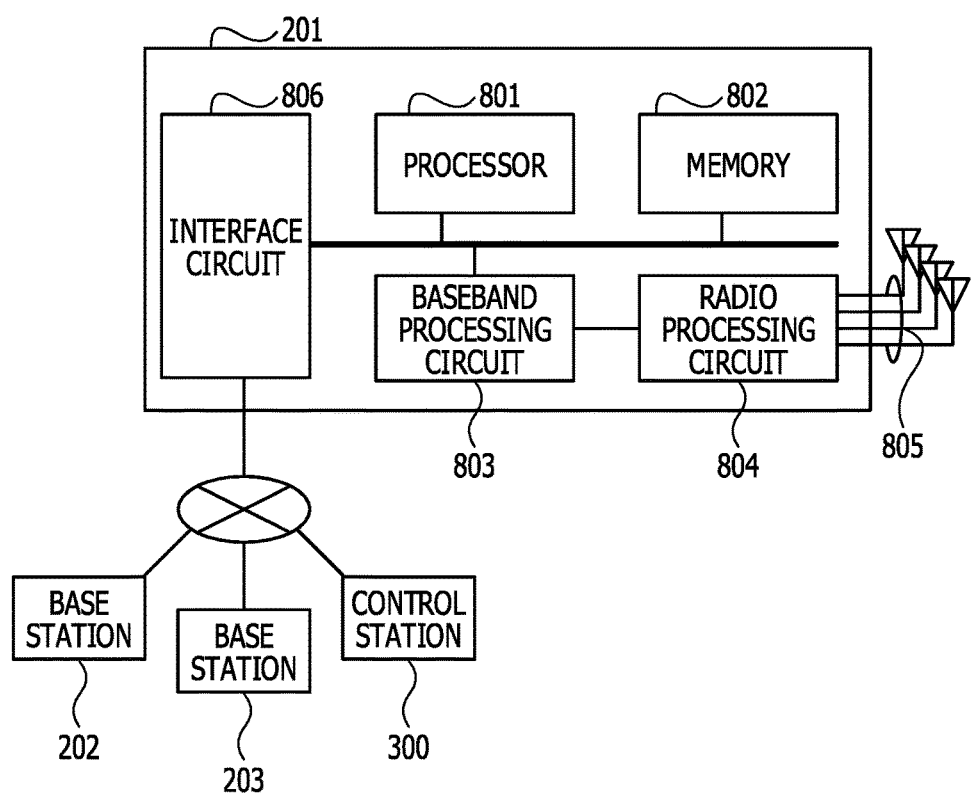
FIG. 5 is a diagram illustrating an example of hardware of a base station according to the second embodiment.

Functions of the base station 201 may be implemented by using hardware illustrated in FIG. 5. Incidentally, hardware of the base stations 202 and 203 is the same as that of the base station 201. FIG. 5 is a diagram illustrating an example of the hardware of the base station according to the second embodiment.

As illustrated in FIG. 5, the base station 201 includes a processor 801, a memory 802, a baseband processing circuit 803, a radio processing circuit 804, an antenna group 805, and an interface circuit 806.

The processor 801 is a processing circuit such as a CPU, a DSP, an ASIC or an FPGA. The memory 802 is a volatile storage device such as a RAM or a nonvolatile storage device such as an HDD or a flash memory. The baseband processing circuit 803 subjects baseband signals to processing such as error correction coding and decoding.

The radio processing circuit 804 generates an RF signal by modulating a carrier wave based on a baseband signal output from the baseband processing circuit 803, and transmits the RF signal from the antenna group 805. In addition, the radio processing circuit 804 demodulates a baseband signal from an RF signal received from the antenna group 805, and inputs the baseband signal to the baseband processing circuit 803. Incidentally, suppose that the AD and DA conversions of the baseband signals are performed by the radio processing circuit 804. The antenna group 805 is a set of a plurality of antennas.

Incidentally, in the case of the digital beamforming system, the adjustment of a phase and an amplitude is made for each antenna in the domain of digital baseband signals (in a stage preceding the DA conversion), and therefore beam switching processing is performed mainly by the baseband processing circuit 803. In the case of the analog beamforming system, on the other hand, the adjustment of the phase and the amplitude is made in the analog domain using an analog phase shifter or the like, and therefore the beam switching processing is performed mainly by the radio processing circuit 804. The technology according to the second embodiment is applicable to both of the systems.

The interface circuit 806 is a communication interface for communicating with the base stations 202 and 203 and the control station 300. The interface circuit 806 is, for example, coupled to a backbone network used for communication between the base stations.

(Control Station)

Figure 6:
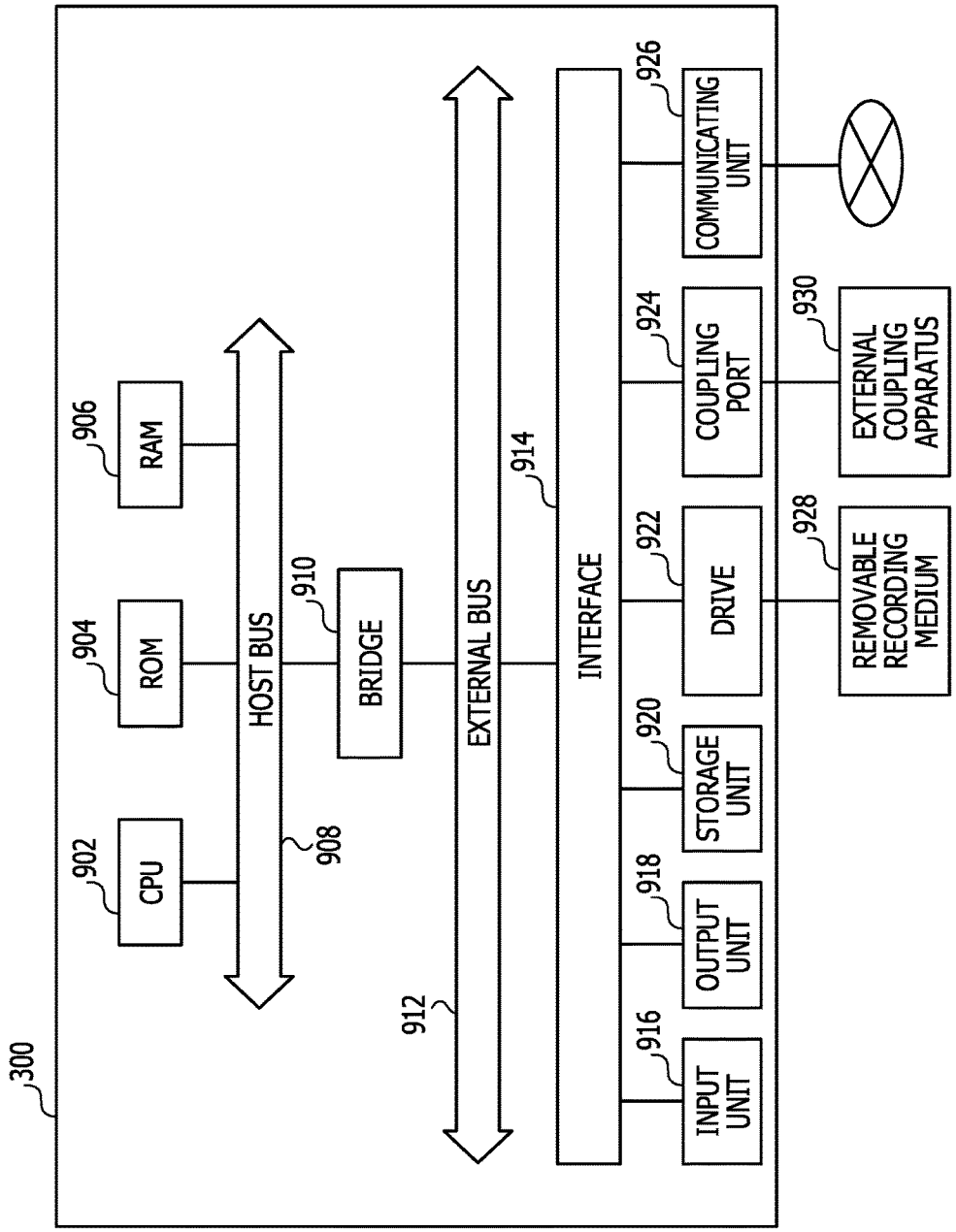
FIG. 6 is a diagram illustrating an example of hardware of a control station according to the second embodiment.

Functions of the control station 300 may be implemented by using hardware illustrated in FIG. 6. For example, the functions of the control station 300 may be implemented by controlling the hardware illustrated in FIG. 6 using a computer program. FIG. 6 is a diagram illustrating an example of the hardware of the control station according to the second embodiment.

As illustrated in FIG. 6, the hardware mainly includes a CPU 902, a read only memory (ROM) 904, a RAM 906, a host bus 908, and a bridge 910. The hardware further includes an external bus 912, an interface 914, an input unit 916, an output unit 918, a storage unit 920, a drive 922, a coupling port 924, and a communicating unit 926.

The CPU 902, for example, functions as an arithmetic processing device or a control device, and controls the whole or a part of operation of each constituent element based on various kinds of programs recorded in the ROM 904, in the RAM 906, in the storage unit 920, or on a removable recording medium 928. The ROM 904 is an example of a storage device storing a program read by the CPU 902, data used for operation, and the like. The RAM 906, for example, temporarily or permanently stores the program read by the CPU 902, various kinds of parameters changing when the program is executed, and the like.

These elements are, for example, coupled to each other via the host bus 908 capable of high-speed data transmission. The host bus 908 is, for example, coupled to the external bus 912, which has a relatively low data transmission speed, via the bridge 910. Used as the input unit 916 are, for example, a mouse, a keyboard, a touch panel, a touch pad, a button, a switch, a lever, and the like.

Used as the output unit 918 is, for example, a display device such as a cathode ray tube (CRT), a liquid crystal display (LCD), a plasma display panel (PDP) or an electroluminescence display (ELD). A printer or the like may also be used as the output unit 918.

The storage unit 920 is a device configured to store various kinds of data. A magnetic storage device such as an HDD is used as the storage unit 920, for example. A semiconductor storage device such as a solid state drive (SSD) or a RAM disk, an optical storage device, a magneto-optical storage device, or the like may also be used as the storage unit 920.

The drive 922 is a device reading information recorded on the removable recording medium 928, which is a recording medium capable of being attached and detached, or writing information to the removable recording medium 928. Used as the removable recording medium 928 is, for example, a magnetic disk, an optical disk, a magneto-optical disk, a semiconductor memory, or the like.

The coupling port 924 is, for example, a port for coupling an external coupling apparatus 930, the port being a universal serial bus (USB) port, an IEEE (Institute of Electrical and Electronics Engineers) 1394 port, a small computer system interface (SCSI), an RS-232C port, or the like. There is, for example, a printer, an auxiliary power supply, or the like as the external coupling apparatus 930.

The communicating unit 926 is a communication device configured to couple to a network. Used as the communicating unit 926 is, for example, a communication circuit for a wired or wireless local area network (LAN), a communication circuit or a router for optical communication, a communication interface for coupling to the backbone network connecting the base stations to each other, or the like.

The hardware has been described above.

[2-3. Functions]

Description will next be made of functions of the radio terminals 101 and 102, the base stations 201, 202, and 203, and the control station 300.

(Radio Terminal)

Figure 7:
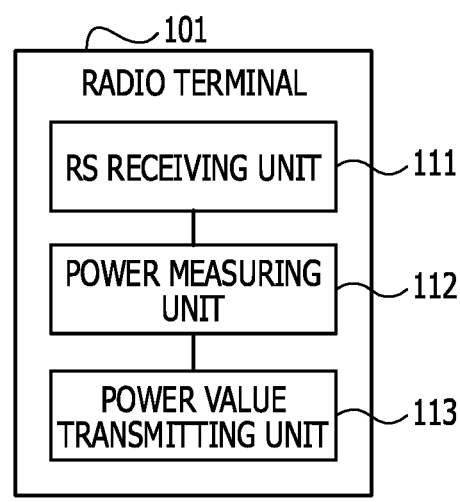
FIG. 7 is a block diagram illustrating an example of functions of a radio terminal according to the second embodiment.

Functions of the radio terminal 101 will first be described with reference to FIG. 7. Incidentally, functions of the radio terminal 102 are similar to those of the radio terminal 101. FIG. 7 is a block diagram illustrating an example of the functions of the radio terminal according to the second embodiment.

As illustrated in FIG. 7, the radio terminal 101 includes an RS receiving unit 111, a power measuring unit 112, and a power value transmitting unit 113.

The RS receiving unit 111 receives a reference signal (RS). The power measuring unit 112 measures the reception power of the reference signal received by the RS receiving unit 111. The power value transmitting unit 113 transmits the reception power measured by the power measuring unit 112 to the base station in the cell in which the radio terminal 101 itself is located (for example, the base station 201 in the cell 71 or the like).

In the following, a jth (j=1, 2) beam output by BS #i (i=1, 2, 3) will be denoted as Bm #ij. In addition, the reception power at UE #k of the reference signal transmitted by the beam Bm #ij will be denoted as rij(k) (k=1, 2).

(Base Station)

Figure 8:
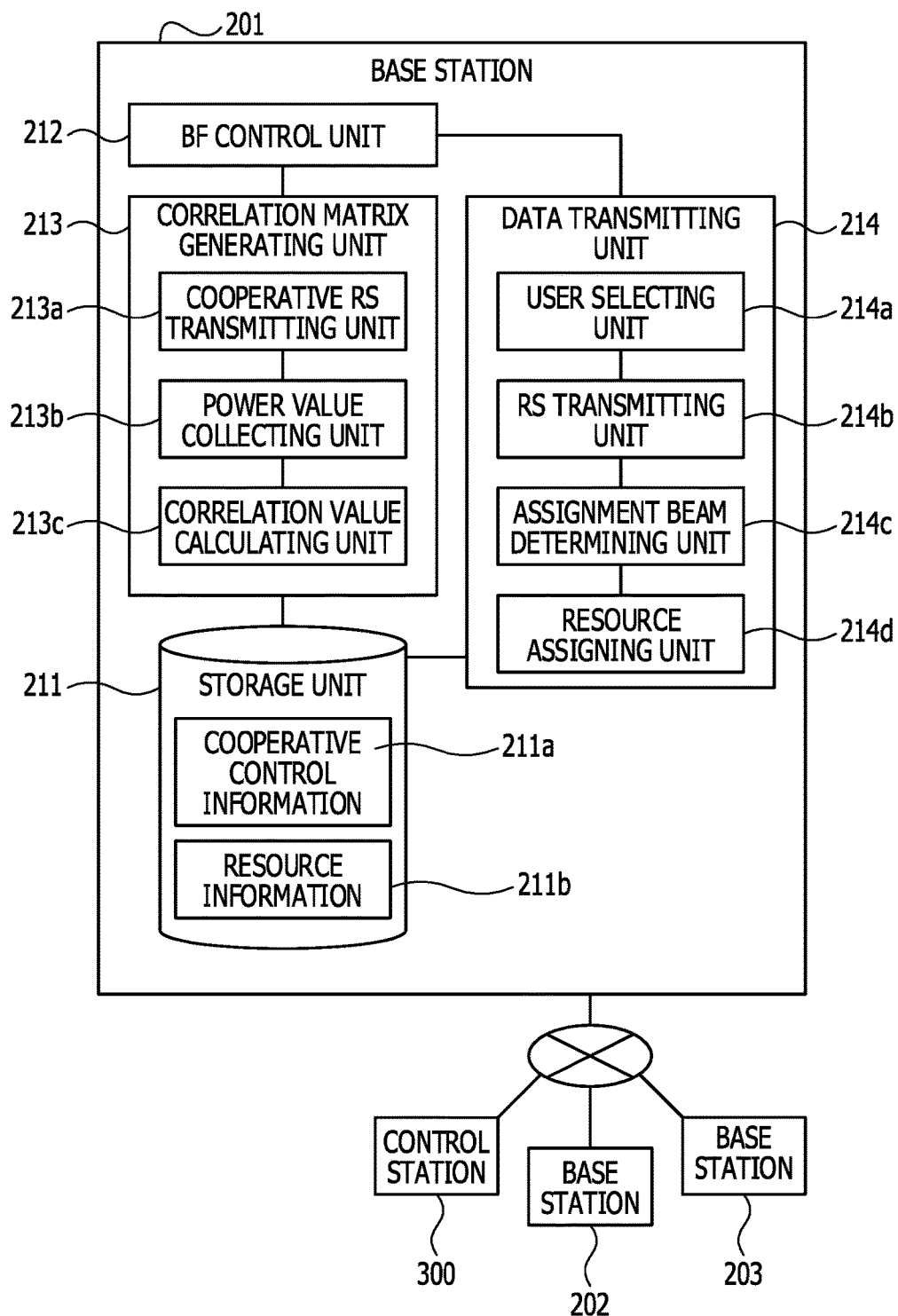
FIG. 8 is a block diagram illustrating an example of functions of a base station according to the second embodiment.

Functions of the base station 201 will next be described with reference to FIG. 8. Incidentally, functions of the base stations 202 and 203 are similar to those of the base station 201 (however, the indexes of the cells and the beams corresponding to the respective base stations are different). FIG. 8 is a block diagram illustrating an example of the functions of the base station according to the second embodiment.

As illustrated in FIG. 8, the base station 201 includes a storage unit 211, a BF control unit 212, a correlation matrix generating unit 213, and a data transmitting unit 214. Functions of the storage unit 211 may be implemented by the memory 802. Functions of the BF control unit 212, the correlation matrix generating unit 213, and the data transmitting unit 214 may be implemented mainly by the processor 801.

The storage unit 211 stores cooperative control information 211*a* and resource information 211*b*.

The cooperative control information 211*a* is, for example, received by the base station 201 from the control station 300 and stored in the storage unit 211 before a start of processing (processing of FIG. 14) related to beam grouping to be described later. As illustrated in FIG. 9, the cooperative control information 211*a* is information indicating timing in which the base stations 201, 202, and 203 each switch and output beams. FIG. 9 is a diagram illustrating an example of the cooperative control information according to the second embodiment. In the example of FIG. 9, Bm #11 is set in a period Ts1, Bm #21 is set in a period Ts2, Bm #31 is set in a period Ts3, Bm #12 is set in a period Ts4, Bm #22 is set in a period Ts5, and Bm #32 is set in a period Ts6. Incidentally, the settings are an example, and may be changed.

Figure 10:
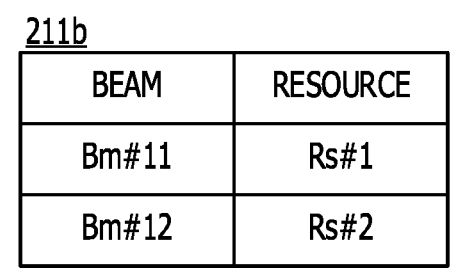

As illustrated in FIG. 10, the resource information 211*b* is information associating a combination of beams strongly interfering with each other with resources assigned to the respective beams. FIG. 10 is a diagram illustrating an example of the resource information (base station) according to the second embodiment. As will be described later, for a combination of beams strongly interfering with each other, assignment resources are set for the respective beams so as to suppress the interference between the beams. Of the setting contents, the resources assigned to the beams used by the base station itself (BS #1 in the example of FIG. 10) are stored as the resource information 211*b* in the storage unit 211.

The BF control unit 212 controls the direction of a beam by controlling the phase and power of radio waves output from the respective antennas. For example, in the case of the digital beamforming system, the BF control unit 212 changes the direction of the beam by controlling mainly the baseband processing circuit 803. In the case of the analog beamforming system, on the other hand, the BF control unit 212 changes the direction of the beam by controlling mainly the radio processing circuit 804.

The correlation matrix generating unit 213 includes a cooperative RS transmitting unit 213a, a power value collecting unit 213b, and a correlation value calculating unit 213c.

The cooperative RS transmitting unit 213a selects a beam based on the cooperative control information 211a, and transmits the reference signal by the selected beam. For example, based on the cooperative control information 211a illustrated in FIG. 9, the cooperative RS transmitting unit 213a transmits the reference signal by Bm #11 in the period Ts1, and transmits the reference signal by Bm #12 in the period Ts4.

The power value collecting unit 213b receives reception power values (rij(k)) of the reference signal, which is transmitted from the base stations 201, 202, and 203 based on the cooperative control information 211a, from a radio terminal (for example, UE #k; k=1, 2) within the cell in which the base station 201 is located. Incidentally, the reception power values received by the power value collecting unit 213b may be expressed in a vector form as in the following Equation (1). Incidentally, ri(k) is a vector.

[Expression 1]

$$ri(k) = [ri1(k), ri2(k)]^T \quad (i=1, 2, 3;\ T\ \text{is transposition}) \quad (1)$$

The correlation value calculating unit 213c calculates correlation values indicating the strengths of interference between beams, using the reception power values received by the power value collecting unit 213b. The correlation values are, for example, given by respective elements of matrices R12 and R13 (correlation matrices) expressed by the following Equation (2). The correlation value calculating unit 213c transmits the calculated correlation matrices R12 and R13 to the control station 300.

[Expression 2]

$$R12 = \left(\frac{1}{k}\right)\sum_{l=1}^{k}\{r1(l)r2(l)^T\},$$

$$R13 = \left(\frac{1}{k}\right)\sum_{l=1}^{k}\{r1(l)r3(l)^T\} \quad (2)$$

Incidentally, while the correlation matrices illustrated in the above-described Equation (2) are calculated in the base station 201, correlation matrices R21 and R23 illustrated in the following Equation (3) are calculated in the base station 202, and correlation matrices R31 and R32 illustrated in the following Equation (4) are calculated in the base station 203. The correlation matrices R21, R23, R31, and R32 are also transmitted to the control station 300.

[Expression 3]

$$R21 = \left(\frac{1}{k}\right)\sum_{l=1}^{k}\{r2(l)r1(l)^T\},$$

$$R23 = \left(\frac{1}{k}\right)\sum_{l=1}^{k}\{r2(l)r3(l)^T\} \quad (3)$$

[Expression 4]

$$R31 = \left(\frac{1}{k}\right)\sum_{l=1}^{k}\{r3(l)r1(l)^T\},$$

$$R32 = \left(\frac{1}{k}\right)\sum_{l=1}^{k}\{r3(l)r2(l)^T\} \quad (4)$$

The control station 300 determines radio resources to be assigned to the beams based on the transmitted correlation matrices R12, R13, R21, R23, R31, and R32. Then, information on the determined radio resources is notified to the base stations 201, 202, and 203. The correlation matrix generating unit 213 stores the information on the radio resources (resource information 211b) notified from the control station 300 in the storage unit 211. The resource information 211b is used by the data transmitting unit 214.

The data transmitting unit 214 includes a user selecting unit 214a, an RS transmitting unit 214b, an assignment beam determining unit 214c, and a resource assigning unit 214d.

The user selecting unit 214a selects a radio terminal as the transmission destination of a data signal by a scheduling method such as a round robin method. The RS transmitting unit 214b transmits the reference signal to the selected radio terminal while switching the beam. The assignment beam determining unit 214c obtains information indicating reception power values of the reference signal transmitted by the RS transmitting unit 214b from the radio terminal selected by the user selecting unit 214a, and assigns a beam corresponding to a maximum reception power value to the radio terminal.

The resource assigning unit 214d checks whether the beam whose assignment is determined by the assignment beam determining unit 214c is included in the resource information 211b. When the beam is included in the resource information 211b, the resource assigning unit 214d assigns a radio resource assigned to the beam to the radio terminal. When the beam whose assignment is determined by the assignment beam determining unit 214c is not included in the resource information 211b, on the other hand, the resource assigning unit 214d assigns an arbitrary usable radio resource to the radio terminal. The data transmitting unit 214 transmits a data signal to the selected radio terminal by the beam assigned by the assignment beam determining unit 214c using the radio resource assigned by the resource assigning unit 214d.

(Control Station)

Figure 11:
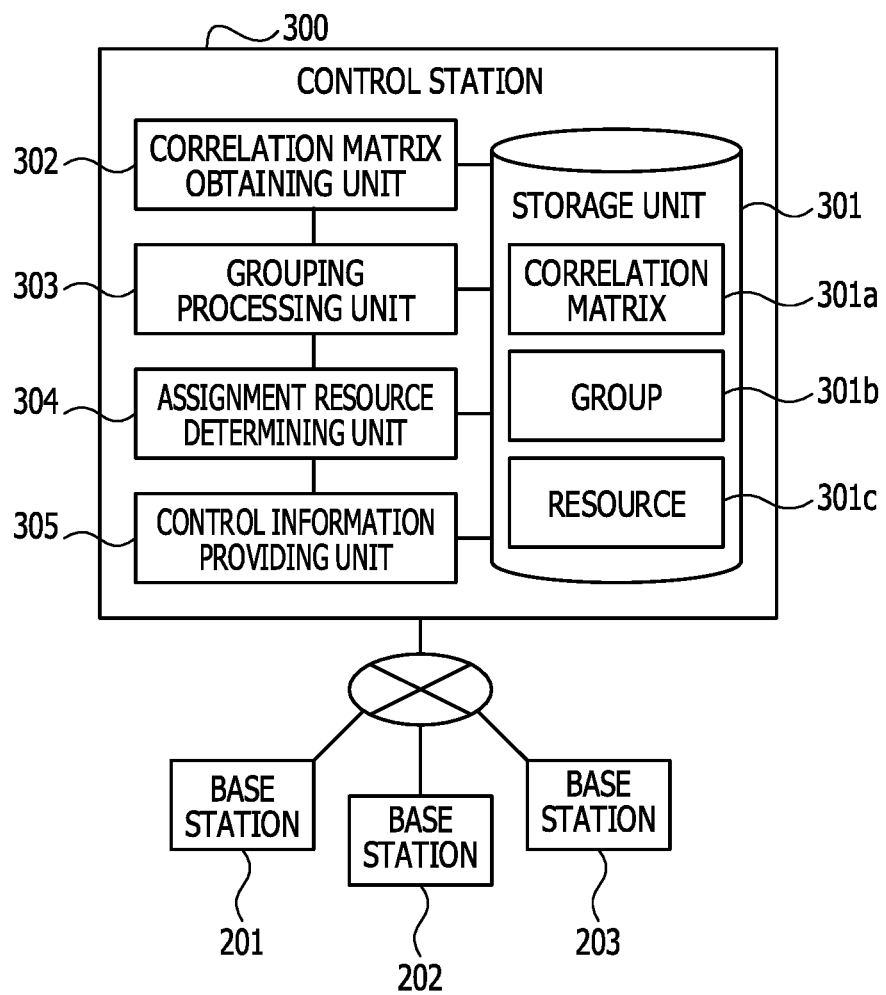
FIG. 11 is a block diagram illustrating an example of functions of a control station according to the second embodiment.

Functions of the control station 300 will next be described with reference to FIG. 11. FIG. 11 is a block diagram illustrating an example of the functions of the control station according to the second embodiment.

As illustrated in FIG. 11, the control station 300 includes a storage unit 301, a correlation matrix obtaining unit 302, a grouping processing unit 303, an assignment resource determining unit 304, and a control information providing unit 305. Functions of the storage unit 301 may be implemented by using the RAM 906, the storage unit 920, or the like. Functions of the correlation matrix obtaining unit 302, the grouping processing unit 303, the assignment resource determining unit 304, and the control information providing unit 305 may be implemented by using mainly the CPU 902 or the like.

The storage unit 301 stores correlation matrix information 301a, group information 301b, and resource information 301c.

The correlation matrix information 301a is information representing the correlation matrices R12, R13, R21, R23, R31, and R32 received from the base stations 201, 202, and 203. As illustrated in FIG. 12, the group information 301b is information indicating a result of grouping combinations of beams according to interference strength. FIG. 12 is a diagram illustrating an example of the group information according to the second embodiment.

In the example of FIG. 12, a combination of Bm #11 and Bm #22 and a combination of Bm #12 and Bm #21 belong to a group G #1. A combination of Bm #11 and Bm #31 belongs to a group G #2. A combination of Bm #22 and Bm #31 belongs to a group G #3. The beam Bm #32 not belonging to the groups G #1 to G #3 belongs to a group G #4. A method of the grouping will be described later.

As illustrated in FIG. 13, the resource information 301c is information on radio resources assigned to the respective beams. FIG. 13 is a diagram illustrating an example of the resource information (control station) according to the second embodiment. In the example of FIG. 13, Rs #1 is associated with the beams Bm #11 and Bm #12 of BS #1, Rs #2 is associated with the beams Bm #21 and Bm #22 of BS #2, and Rs #3 is associated with the beam Bm #31 of BS #3. As for Bm #32, a setting is made such that any of the radio resources Rs #1 to Rs #3 may be assigned to Bm #32. A method of setting the assignment resources will be described later.

The correlation matrix obtaining unit 302 obtains correlation matrices from the base stations 201, 202, and 203. In addition, the correlation matrix obtaining unit 302 averages correlation matrices whose index combinations are the same (for example, R12 and R21) among the obtained correlation matrices, and generates an averaged correlation matrix. In addition, the grouping processing unit 303 generates the group information 301b by grouping the beams based on averaged correlation matrices. Incidentally, an averaged correlation matrix Qmn is given by the following Equation (5), for example.

[Expression 5]

$$Qmn = \frac{Rmn + Rnm^T}{2} \quad (5)$$

As an example, the grouping processing unit 303 refers to each element of a correlation matrix Q12, and identifies an element whose value is larger than a preset threshold value. The grouping processing unit 303 then includes a combination of beams corresponding to the identified element in a group. In a case where an element in a pth row and a qth column of the correlation matrix Qmn is denoted as Qmn(p, q), the correlation matrix Q12 is the following Equation (6), and the threshold value is six, the grouping processing unit 303 identifies Q12(1, 1) and Q12(2, 2).

[Expression 6]

$$Q12 = \begin{pmatrix} 7.5 & 2.5 \\ 5.5 & 12.5 \end{pmatrix} \quad (6)$$

From the definitions of Equation (1), Equation (2), and Equation (5) described above, Q12(1, 1) represents a correlation between Bm #11 and Bm #21, and Q12(2, 2) represents a correlation between Bm #12 and Bm #22. In addition, Q12 corresponds to a combination of the beams of BS #1 and the beams of BS #2. The grouping processing unit 303 accordingly generates the group G #1 corresponding to a combination of BS #1 and BS #2. The grouping processing unit 303 then registers the combination of Bm #11 and Bm #21 and the combination of Bm #12 and Bm #22 in the group G #1.

For Q13 and Q23, the grouping processing unit 303 similarly identifies an element whose value is larger than the threshold value, and performs the generation of a group and registration in the group. For example, for Q13, the grouping processing unit 303 generates the group G #2 corresponding to a combination of BS #1 and BS #3, and registers a combination of Bm #11 and Bm #31 in the group G #2. In addition, for Q23, the grouping processing unit 303 generates the group G #3 corresponding to a combination of BS #2 and BS #3, and registers a combination of Bm #22 and Bm #31 in the group G #3.

In addition, the grouping processing unit 303 generates the group G #4 for registering a beam not included in any of the groups G #1, G #2, and G #3. Then, the grouping processing unit 303 identifies the beam Bm #32 not included in any of the groups G #1, G #2, and G #3, and registers the beam Bm #32 in the group G #4. In the present example, the group information 301b illustrated in FIG. 12 is obtained.

Incidentally, while the method of using the averaged correlation matrices Qmn has been illustrated, the group information 301b may be generated using correlation matrices Rmn (m<n) having m smaller than n among the correlation matrices Rmn in place of Qmn (modification). In addition, when a certain beam is included in a plurality of groups, the beam may be included in a group in which the beam has a highest correlation (modification).

The assignment resource determining unit 304 determines assignment resources to be assigned to the respective beams based on the group information 301b. At this time, the assignment resource determining unit 304 determines the assignment resources such that different radio resources are assigned to beams of different base stations among the beams belonging to the same group.

For example, in the case of the group information 301b illustrated in FIG. 12, the group G #1 includes the beams Bm #11 and Bm #12 of BS #1 and the beams Bm #21 and Bm #22 of BS #2. In this case, the assignment resource determining unit 304 determines the assignment resources such that the resource assigned to the beams Bm #11 and Bm #12 of BS #1 is different from the resource assigned to the beams Bm #21 and Bm #22 of BS #2.

For example, the assignment resource determining unit 304 assigns Rs #1 to Bm #11 and Bm #12, and assigns Rs #2 to Bm #21 and Bm #22. Also for the groups G #2 and G #3, the assignment resource determining unit 304 similarly determines assignment resources. At this time, when there is a beam whose assignment resource is previously determined, the assignment resource determining unit 304 sets the resource assigned to the beam as a reference, and determines a resource to be assigned to another beamforming a set with the beam in question.

In addition, the assignment resource determining unit 304 sets an arbitrary radio resource (for example, all of the assignment resources set to the beams in the groups G #1 to G #3) as a resource assigned to the beam included in the group G #4. In the present example, the resource information 301c illustrated in FIG. 13 is obtained.

The control information providing unit 305 provides information indicating the relations between the beams and the assignment resources to the respective base stations 201, 202, and 203 based on the resource information 301c. For example, the control information providing unit 305 transmits information on the assignment resources related to the beams Bm #11 and Bm #12 of BS #1 (both of the assignment resources are Rs #1) to the base station 201 (BS #1).

In addition, the control information providing unit 305 transmits information on the assignment resources related to the beams Bm #21 and Bm #22 of BS #2 (both of the assignment resources are Rs #2) to the base station 202 (BS #2). In addition, the control information providing unit 305 transmits information on the assignment resource (Rs #3) related to the beam Bm #31 of BS #3 to the base station 203 (BS #3).

Incidentally, the control information providing unit 305 may transmit, or may not transmit, information on the assignment resource (Rs #1 to Rs #3) related to the beam (Bm #32), to which an arbitrary radio resource is assigned. In addition, the information on the assignment resources may be transmitted to the respective base stations 201, 202, and 203 according to the beams, as described above, or the resource information 301c may be provided to all of the base stations 201, 202, and 203 (modification).

Functions of the radio terminals 101 and 102, the base stations 201, 202, and 203, and the control station 300 have been described above.

As described above, inter-cell interference may be suppressed by assigning radio resources different from each other to beams between adjacent cells causing a strong interference, and assigning the radio resources to radio terminals using the beams. For example, inter-cell interference may be suppressed by checking whether beams suitable for use by radio terminals as data transmission destinations are registered as the beams causing the strong interference, and using the designated assignment resources when the beams are registered.

Hence, inter-cell interference may be suppressed more easily as compared with a method such as the CB system that suppresses inter-cell interference using channel information obtained from the base stations of adjacent cells through high-speed communication interfaces. This may consequently contribute to a reduction in cost involved in the installation, operation, and the like of the high-speed communication interfaces and a reduction in a load involved in processing of calculating beamforming weights in consideration of the channel information of the adjacent cells.

[2-4. Flow of Processing]

A flow of processing in a radio communication system will next be described.

(Operation of Radio Communication System)

Figure 14:
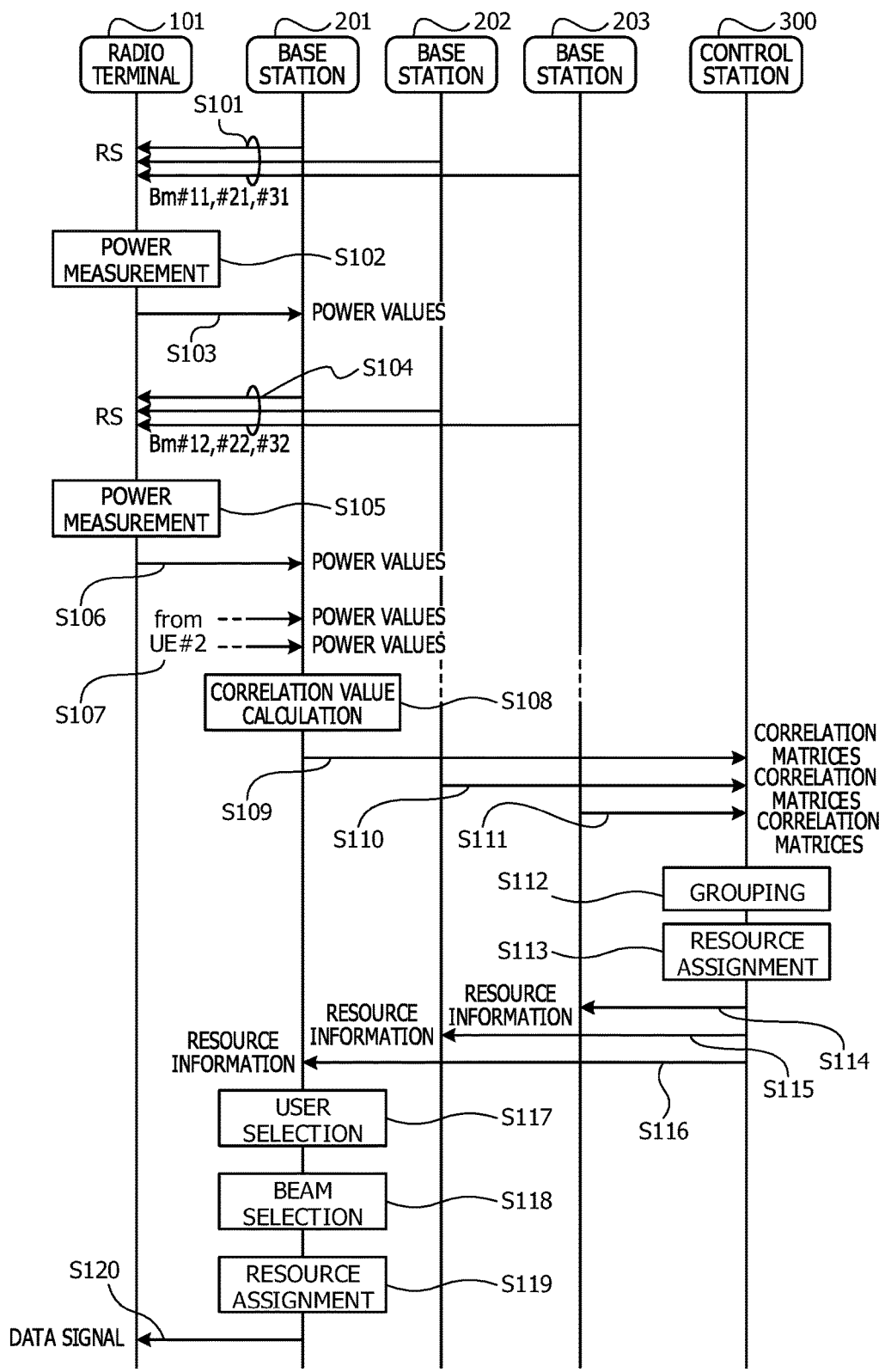
FIG. 14 is a sequence diagram illustrating an example of operation of a radio communication system according to the second embodiment.

A reference will be made to FIG. 14. FIG. 14 is a sequence diagram illustrating an example of operation of a radio communication system according to the second embodiment. The radio communication system described with reference to FIG. 14 may be the radio communication system 50 illustrated in FIG. 2.

The example of FIG. 14 includes processing in a first stage related to the grouping of beams and processing in a second stage related to the control of assignment of radio resources to radio terminals based on information (resource information 211b) on the radio resources assigned to the respective beams. FIG. 14 illustrates a processing sequence in which the processing in the first stage (S101 to S116) and the processing in the second stage (S117 to S120) are performed successively for the convenience of description. However, it suffices to perform the processing in the first stage in preset timing (for example, once a day, once every week, or the like), and the processing in the first stage does not need to be performed each time a base station transmits a data signal.

(S101)

The cooperative RS transmitting unit 213a of the base station 201 transmits the reference signal (RS) using the beam Bm #11 based on the cooperative control information 211a (see FIG. 9). The base station 202 similarly transmits the reference signal (RS) using the beam Bm #21. The base station 203 similarly transmits the reference signal (RS) using the beam Bm #31.

(S102)

The radio terminal 101 receives the reference signal transmitted from the base stations 201, 202, and 203 by the RS receiving unit 111, and measures reception power values (r11(1), r21(1), and r31(1)) by the power measuring unit 112.

(S103)

The radio terminal 101 transmits the reception power values (r11(1), r21(1), and r31(1)) measured by the power measuring unit 112 to the base station 201 by the power value transmitting unit 113. Incidentally, suppose that the radio terminal 101 is present within the cell 71 formed by the base station 201.

(S104)

The cooperative RS transmitting unit 213a of the base station 201 transmits the reference signal (RS) using the beam Bm #12 based on the cooperative control information 211a (see FIG. 9). The base station 202 similarly transmits the reference signal (RS) using the beam Bm #22. The base station 203 similarly transmits the reference signal (RS) using the beam Bm #32.

(S105)

The radio terminal 101 receives the reference signal transmitted from the base stations 201, 202, and 203 by the RS receiving unit 111, and measures reception power values (r12(1), r22(1), and r32(1)) by the power measuring unit 112.

(S106)

The radio terminal 101 transmits the reception power values (r12(1), r22(1), and r32(1)) measured by the power measuring unit 112 to the base station 201 by the power value transmitting unit 113.

(S107)

The radio terminal 102 (UE #2) measures reception power values (r11(2), r21(2), r31(2), r12(2), r22(2), and r32(2)) as in S102 and S105, and transmits a result of the measurement to the base station 201. The base station 201 receives the reception power values (r11(2), r21(2), r31(2), r12(2), r22 (2), and r32(2)) measured by the radio terminal 102. Incidentally, suppose that the radio terminal 102 is present within the cell 71 formed by the base station 201.

(S108 and S109)

The base station 201 calculates, by the correlation value calculating unit 213c, correlation matrices R12 and R13 (see Equation (2) described above) having correlation values indicating beam correlations as elements based on the reception power values received in S103, S106, and S107. The base station 201 then transmits the correlation matrices R12 and R13 calculated by the correlation value calculating unit 213c to the control station 300.

(S110)

A radio terminal present in the cell 72 in which the base station 202 is located measures reception power values of the reference signal (RS) transmitted from the base stations 201, 202, and 203 as in S102 and S105, and transmits a result of the measurement to the base station 202. The base station 202 calculates correlation matrices R21 and R23 (see Equation (3) described above) based on the received reception power values as in S108, and transmits the calculated correlation matrices R21 and R23 to the control station 300.

(S111)

A radio terminal present in the cell 73 in which the base station 203 is located measures reception power values of the reference signal (RS) transmitted from the base stations 201, 202, and 203 as in S102 and S105, and transmits a result of the measurement to the base station 203. The base station 203 calculates correlation matrices R31 and R32 (see Equation (4) described above) based on the received reception power values as in S108, and transmits the calculated correlation matrices R31 and R32 to the control station 300.

(S112)

The control station 300 generates the group information 301b (see FIG. 12) by grouping the beams based on the correlation matrices R12, R13, R21, R23, R31, and R32 obtained from the base stations 201, 202, and 203 by the grouping processing unit 303.

As an example, the grouping processing unit 303 calculates the correlation matrices Q12, Q13, and Q23 (Qmn is an average of Rmn and Rnm) based on Equation (5) described above. In addition, the grouping processing unit 303 generates the group G #1 corresponding to the correlation matrix Q12. The correlation matrix Q12 corresponds to a combination of the beams output by the base stations 201 and 202 (UE #1 and UE #2). For example, the group G #1 is a group corresponding to a combination of the base stations 201 and 202.

In addition, the grouping processing unit 303 compares each element of the correlation matrix Q12 with a threshold value, and includes a combination of beams corresponding to an element whose value is larger than the threshold value in the group G #1. For example, an element Q12(1, 1) located in a first row and a first column of the correlation matrix Q12 corresponds to a combination of Bm #11 and Bm #21. When the value of the element Q12(1, 1) is larger than the threshold value, the grouping processing unit 303 includes Bm #11 and Bm #21 in the group G #1.

The grouping processing unit 303 similarly generates the group G #2 corresponding to the correlation matrix Q13, compares each element of the correlation matrix Q13 with the threshold value, and includes a combination of beams corresponding to an element whose value is larger than the threshold value in the group G #2. In addition, the grouping processing unit 303 generates the group G #3 corresponding to the correlation matrix Q23, compares each element of the correlation matrix Q23 with the threshold value, and includes a combination of beams corresponding to an element whose value is larger than the threshold value in the group G #3.

In addition, the grouping processing unit 303 generates the group G #4 for registering a beam not included in any of the groups G #1 to G #3. The grouping processing unit 303 then identifies a beam not included in any of the groups G #1 to G #3, and includes the identified beam in the group G #4. By such processing, the grouping processing unit 303 generates the group information 301b as illustrated in FIG. 12, for example. Incidentally, the above-described threshold value may be set in advance or may, for example, be set for each correlation matrix so as to minimize a difference between the number of elements included in the group and the number of remaining elements.

(S113)

The control station 300 determines radio resources (assignment resources) to be assigned to the respective beams based on the group information 301b by the assignment resource determining unit 304. At this time, the assignment resource determining unit 304 determines the assignment resources such that, of the beams included in the same group, beams of different base stations are assigned different radio resources.

For example, in the case of the group information 301b illustrated in FIG. 12, the group G #1 includes Bm #11, Bm #12, Bm #21, and Bm #22. In this case, the assignment resource determining unit 304 determines the assignment resources such that the assignment resource of Bm #11 and Bm #12 corresponding to the base station 201 (BS #1) is different from the assignment resource of Bm #21 and Bm #22 corresponding to the base station 202 (BS #2).

For example, the assignment resource determining unit 304 sets Rs #1 as the assignment resource of Bm #11 and Bm #12, and sets Rs #2 as the assignment resource of Bm #21 and Bm #22 (see FIG. 13). Incidentally, it suffices for the two assignment resources to be different from each other at least on a frequency axis or on a time axis.

(S114, S115, and S116)

The control station 300 transmits information (resource information) indicating the assignment resources of the respective beams to the base stations 201, 202, and 203 by the control information providing unit 305. At this time, the control information providing unit 305 may transmit the resource information 301c to the base stations 201, 202, and 203, or may transmit, to each base station, information indicating the assignment resources of the beams corresponding to the base station, the information being extracted from the resource information 301c.

(S117)

The base station 201 selects a radio terminal as the transmission destination of a data signal by the user selecting unit 214a. For example, the user selecting unit 214a selects a radio terminal present within the cell 71 by using a round robin method or the like. Incidentally, suppose in this case that the radio terminal 101 is selected.

(S118)

The base station 201 transmits the reference signal (RS) to the radio terminal 101 selected in S117 by the RS transmitting unit 214b, and obtains reception power values measured by the radio terminal 101. Then, the base station 201 selects a beam whose reception power value is a maximum based on the obtained reception power values, and sets the beam as a beam assigned to the radio terminal 101, by the assignment beam determining unit 214c.

(S119)

The base station 201 determines a radio resource to be assigned to the radio terminal 101 based on the resource information 301c (see FIG. 10) received from the control station 300 by the resource assigning unit 214d.

For example, the resource assigning unit 214d refers to the resource information 301c, and determines whether the beam selected in S118 is included in the resource information 301c. When the selected beam is included in the resource information 301c, the resource assigning unit 214d assigns the assignment resource indicated in the resource information 301c to the radio terminal 101. When the selected beam is not included in the resource information 301c, on the other hand, the resource assigning unit 214d assigns an arbitrary radio resource usable by the base station 201 to the radio terminal 101.

(S120)

The base station 201 transmits a data signal to the radio terminal 101 using the beam selected in S118 and the radio resource assigned in S119. The series of processing illustrated in FIG. 14 is ended when the processing of S120 is completed. Inter-cell interference may be suppressed without the use of channel information of adjacent cells, by assigning respective different radio resources to beams causing a strong interference between the adjacent cells in advance and assigning the radio resources to respective radio terminals based on the assignment, as described above.

(Identification of Adjacent Base Stations and Determination of Non-Interference Resource Sets)

The description thus far has been made by taking as an example a system including three base stations adjacent to each other for the convenience of the description. In the following, an extension to a system including more base stations will be assumed, and referring to FIG. 15, description will be made of identification of adjacent base stations and determination of non-interference resource sets.

Figure 15:
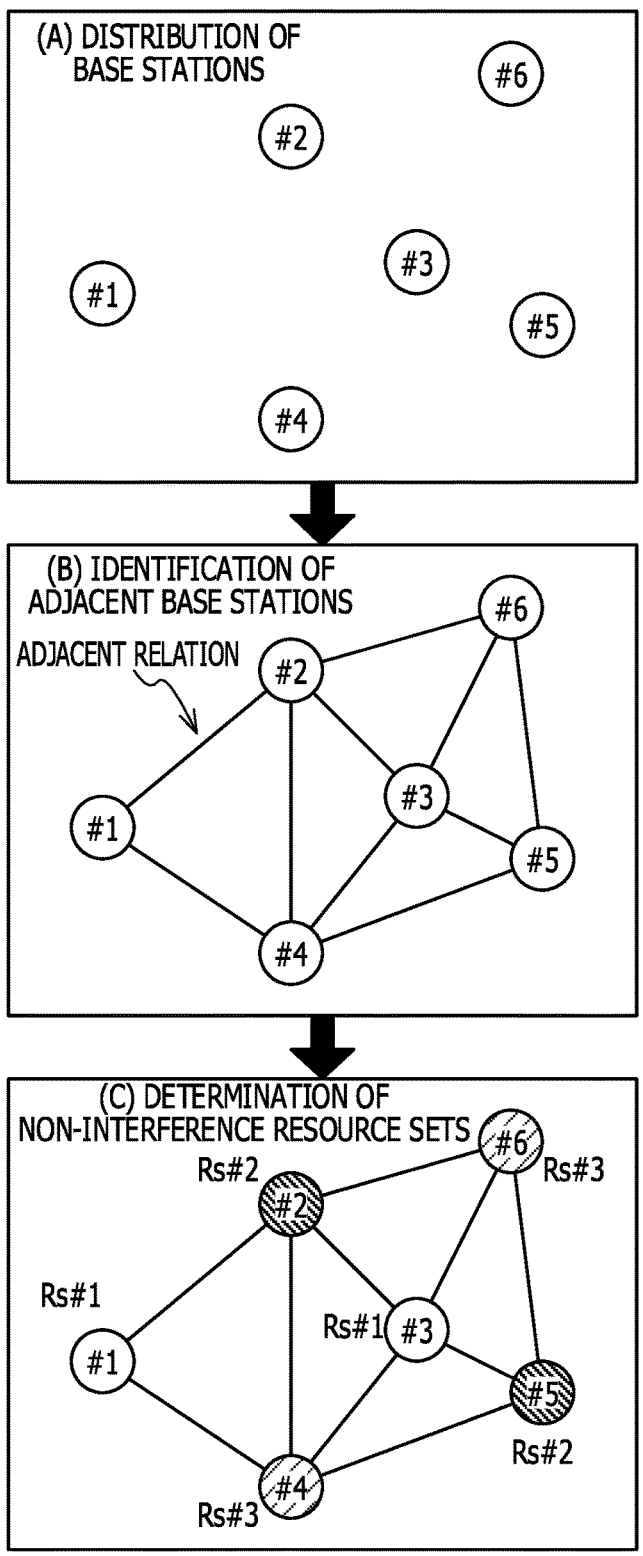
FIG. 15 is a diagram of assistance in explaining identification of adjacent base stations and determination of non-interference resource sets, the identification and the determination being performed by a control station according to the second embodiment.

A non-interference resource set referred to herein is a set of assignment resources (non-interference resources) in a case where each base station is assigned a radio resource such that the radio resources assigned to adjacent cells are different from each other. FIG. 15 is a diagram of assistance in explaining identification of adjacent base stations and determination of non-interference resource sets, the identification and the determination being performed by a control station according to the second embodiment. The control station described with reference to FIG. 15 may be the control station illustrated in FIG. 2.

In FIG. 15, circles represent base stations, and numbers included within the circles indicate identification numbers identifying the base stations. For example, a circle including #1 therewithin represents a base station BS #1. In the example of (A) in FIG. 15, six base stations BS #i (i=1, 2, . . . , 6) are depicted.

Combinations of adjacent base stations may be determined more or less subjectively from the arrangement of the base stations. For example, a region obtained by applying Voronoi tessellation to the position of each base station is regarded as a cell formed by the base station, and a base station that the cell is adjacent to may be determined as an adjacent base station. In (B) in FIG. 15, BS #1 and BS #2 are in adjacent relation to each other, BS #1 and BS #4 are in adjacent relation to each other, BS #2 and BS #3 are in adjacent relation to each other, BS #2 and BS #4 are in adjacent relation to each other, BS #2 and BS #6 are in adjacent relation to each other, BS #3 and BS #4 are in adjacent relation to each other, BS #3 and BS #5 are in adjacent relation to each other, BS #3 and BS #6 are in adjacent relation to each other, BS #4 and BS #5 are in adjacent relation to each other, and BS #5 and BS #6 are in adjacent relation to each other.

As a method of assigning mutually different radio resources (non-interference resources) to base stations in adjacent relation to each other, a full search method may be applied which searches for non-interference resource sets while increasing the number of radio resources Rs #I (I=1, . . . , L) in order, for example. The full search method tries assignment in combinations of (Number of Radio Resources)^(Number of Base Stations−1) while increasing L, and checks whether a state is obtained in which adjacent base stations do not use a same radio resource. Incidentally, (Number of Base Stations−1) is set because a first assignment may be fixed.

However, the larger the number of base stations, the higher the processing load of the full search method. Thus, when there are a large number of base stations, it is preferable to determine non-interference resource sets by using a graph coloring algorithm (for example, the Welsh-Powell algorithm) or the like. The graph coloring algorithm is an algorithm that performs painting in a small number of different colors in a graph having a plurality of demarcated regions such as a map such that regions adjacent to each other have different colors.

When this algorithm is applied, the base stations may be painted in different colors as illustrated in (C) in FIG. 15, for example (different hatchings in (C) in FIG. 15). For example, when different radio resources are assigned to base stations having different colors, the different radio resources (non-interference resources) may be assigned to the base stations in adjacent relation to each other, and thus non-interference resource sets are obtained. In the example of (C) in FIG. 15, Rs #1 is assigned as a non-interference resource to BS #1 and BS #3 not adjacent to each other, Rs #2 is assigned as a non-interference resource to BS #2 and BS #5 not adjacent to each other, and Rs #3 is assigned as a non-interference resource to BS #4 and BS #6 not adjacent to each other.

Inter-cell interference is suppressed when non-interference resources are used according to the above-described assignment. The following description will be made of an example in which non-interference resource sets are used for the assignment of radio resources.

(Grouping of Beams)

The description thus far has been made supposing that the number of beams used by each base station is two for the convenience of the description. In the following, referring to FIG. 16 and FIG. 17, description will be made of processing related to the grouping of beams in a case where each base station may use N beams (N is a natural number). Incidentally, the number of beams may differ between the base stations. In this case, the loops of S202 and S203 to be described later are modified according to the number of beams of each base station.

Incidentally, in the case where non-interference resource sets are used, the control station 300 groups beams, and provides group information to the base stations 201, 202, and 203. In addition, the base stations 201, 202, and 203 determine the assignment of radio resources to radio terminals based on the group information and the non-interference resource sets.

Figure 16:
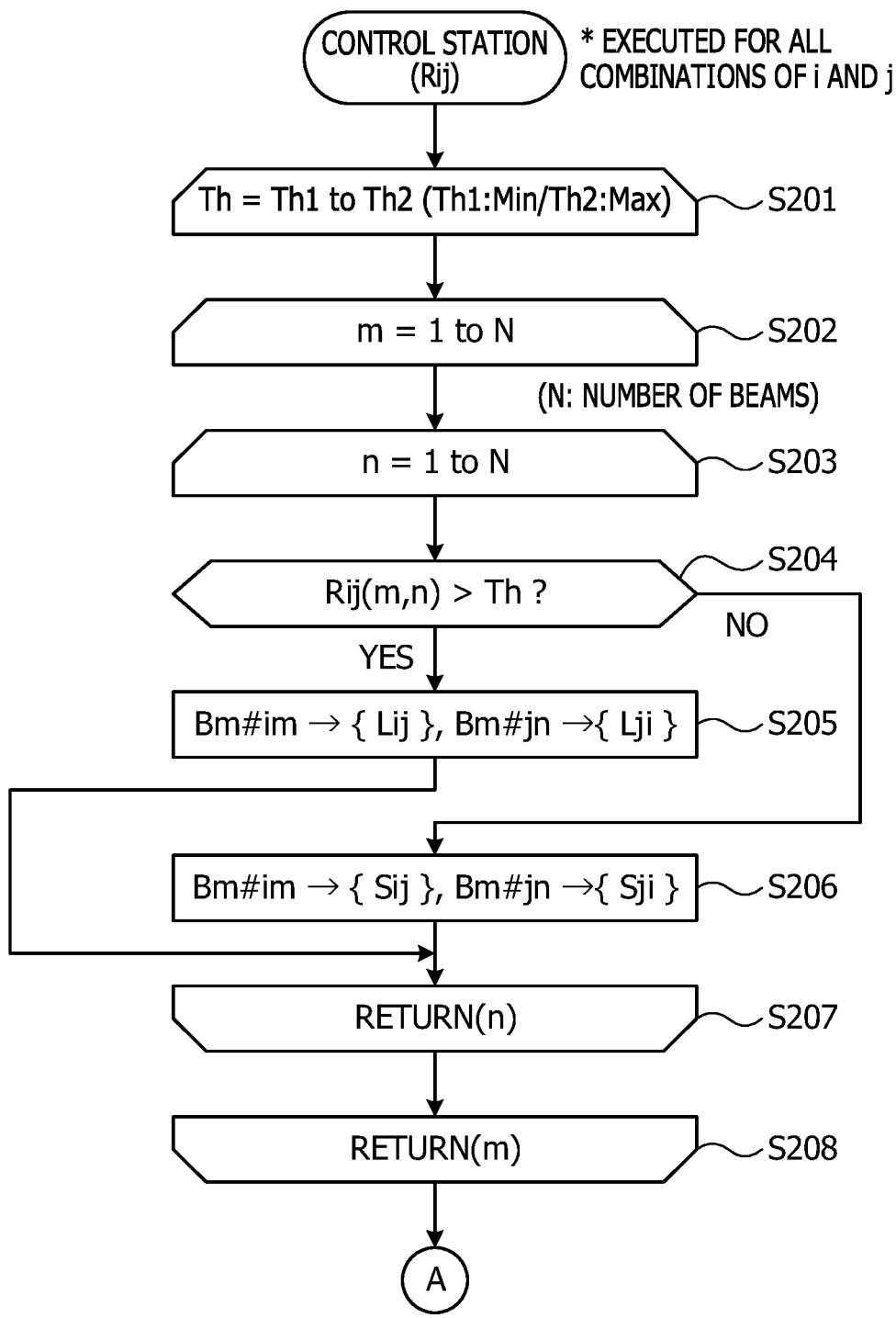
FIG. 16 is a first flowchart illustrating a flow of processing related to grouping of beams, the processing being performed by a control station according to the second embodiment.
Figure 17:
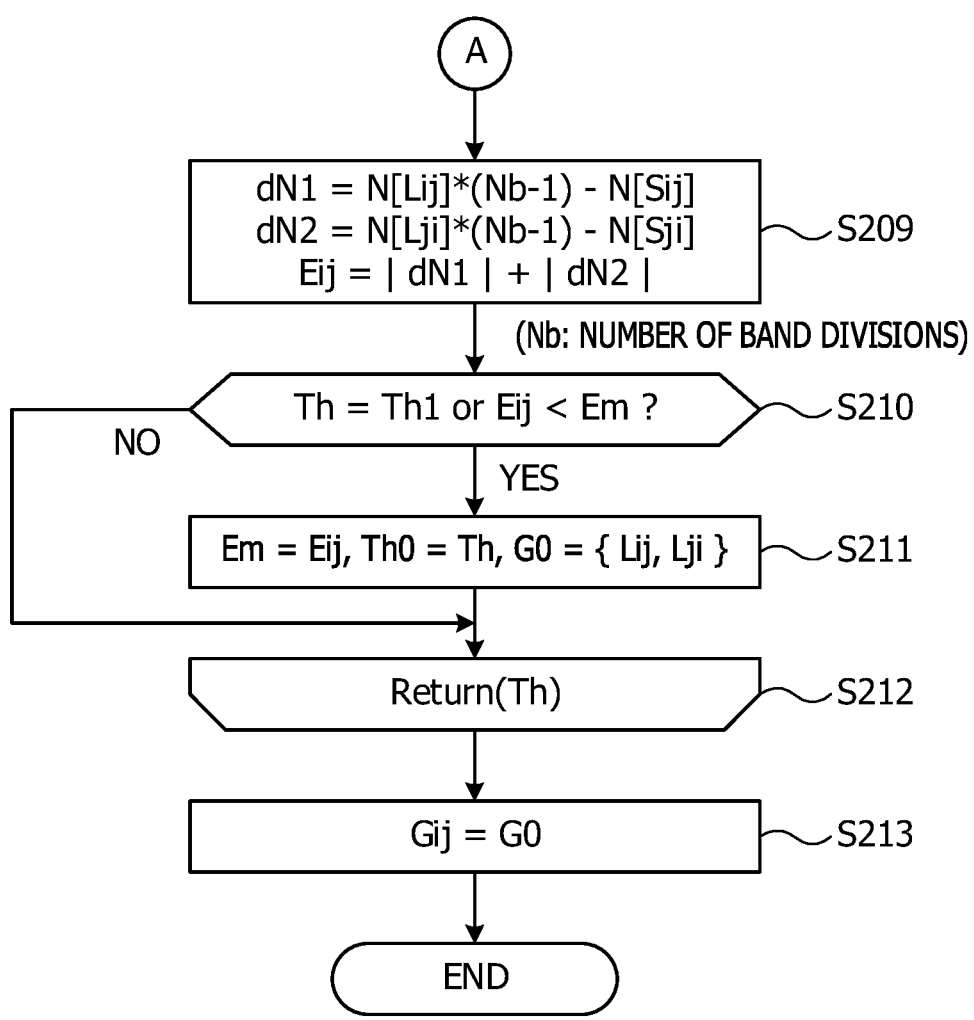
FIG. 17 is a second flowchart illustrating the flow of processing related to the grouping of beams, the processing being performed by the control station according to the second embodiment.

FIG. 16 is a first flowchart illustrating a flow of processing related to grouping of beams, the processing being performed by a control station according to the second embodiment. FIG. 17 is a second flowchart illustrating the flow of processing related to the grouping of beams, the processing being performed by the control station according to the second embodiment. The control station described with reference to FIG. 16 and FIG. 17 may be the control station 300 illustrated in FIG. 2. Incidentally, FIG. 16 and FIG. 17 illustrate processing related to a correlation matrix Rij. The grouping processing unit 303 performs the processing of FIG. 16 and FIG. 17 for all combinations of i and j.

(S201 and S212)

The grouping processing unit 303 repeatedly performs processing from S202 to S211 while changing a parameter Th from Th1 to Th2 by a fixed step value. Th is a parameter representing a threshold value compared with elements of the correlation matrix Rij to determine beams to be included in a group. Th1 is a lower limit value of a possible range of the threshold value Th. Th2 is an upper limit value of the possible range of the threshold value Th. Th1, Th2, and the fixed step value are set in advance. When the iterative processing is ended, the processing proceeds to S213.

(S202 and S208)

The grouping processing unit 303 repeatedly performs processing from S203 to S207 while changing a parameter m from 1 to N. When the iterative processing is ended, the processing proceeds to S209.

(S203 and S207)

The grouping processing unit 303 repeatedly performs processing from S204 to S206 while changing a parameter n from 1 to N. When the iterative processing is ended, the processing proceeds to S208.

(S204)

The grouping processing unit 303 determines whether or not an element Rij(m, n) located in an mth row and an nth column of the correlation matrix Rij is larger than the threshold value Th. When the element Rij(m, n) is larger than the threshold value Th, the processing proceeds to S205. When the element Rij(m, n) is not larger than the threshold value Th, on the other hand, the processing proceeds to S206.

(S205)

The grouping processing unit 303 includes the beam Bm #im of BS #i in a beam set Lij. In addition, the grouping processing unit 303 includes the beam Bm #jn of BS #j in a beam set Lji. The sets Lij and Lji are sets of beams having a strong correlation (the element Rij(m, n) is larger than the threshold value Th). When the processing of S205 is completed, the processing proceeds to S207.

(S206)

The grouping processing unit 303 includes the beam Bm #im of BS #i in a beam set Sij. In addition, the grouping processing unit 303 includes the beam Bm #jn of BS #j in a beam set Sji. The sets Sij and Sji are sets of beams having a weak correlation (the element Rij(m, n) is not larger than the threshold value Th). When the processing of S206 is completed, the processing proceeds to S207.

(S209)

The grouping processing unit 303 calculates an evaluation value Eij based on the following Equation (7), where N[X] is the number of beams included in a set X, and Nb is the number of resources that may be used as non-interference resources (total number of resources in the present example). The evaluation value Eij is an evaluation value for evaluating a balance between the number of elements having values larger than the threshold value Th and the number of elements having values not larger than the threshold value Th. The closer the ratio between these two numbers of elements comes to a given value, the smaller the evaluation value Eij becomes. Incidentally, | . . . | denotes an absolute value.

[Expression 7]

$$dN1 = N[Lij] \times (Nb-1) - N[Sij],$$

$$dN2 = N[Lji] \times (Nb-1) - N[Sji],$$

$$Eij = |dN1| + |dN2| \qquad (7)$$

(S210)

The grouping processing unit 303 determines whether the threshold value Th is equal to Th1 and whether the evaluation value Eij is smaller than a parameter Em. When the threshold value Th is equal to Th1 or the evaluation value Eij is smaller than the parameter Em, the processing proceeds to S211. When the threshold value Th is not equal to Th1 nor is the evaluation value Eij smaller than the parameter Em, on the other hand, the processing proceeds to S212.

(S211)

The grouping processing unit 303 sets the evaluation value Eij as the parameter Em. In addition, the grouping processing unit 303 sets the threshold value Th as a candidate threshold value Th0. In addition, the grouping processing unit 303 sets a set {Lij, Lji} as a candidate group G0. When the processing of S211 is completed, the processing proceeds to S212.

(S213)

The grouping processing unit 303 sets the candidate group G0 as a group Gij corresponding to the correlation matrix Rij. Incidentally, the grouping processing unit 303 may store the candidate threshold value Th0 in the storage unit 301, and use the candidate threshold value Th0 when performing the grouping processing next.

When groups Gij are obtained for all of correlation matrices Rij, the grouping processing unit 303 transmits information on the groups Gij to each base station. At this time, the grouping processing unit 303 transmits information on $\cup_l$Gil (where I≠i) to BS #i (i=1, 2, . . . ). ∪ denotes a sum of sets. When the processing of S213 is completed, the series of processing illustrated in FIG. 16 and FIG. 17 is ended.

Incidentally, while the beams are grouped using the correlation matrices Rij in this case, the beams may be grouped using the correlation matrices (averages) Qij illustrated in Equation (5) described above.

(Assignment of Resources to Radio Terminals)

Figure 18:
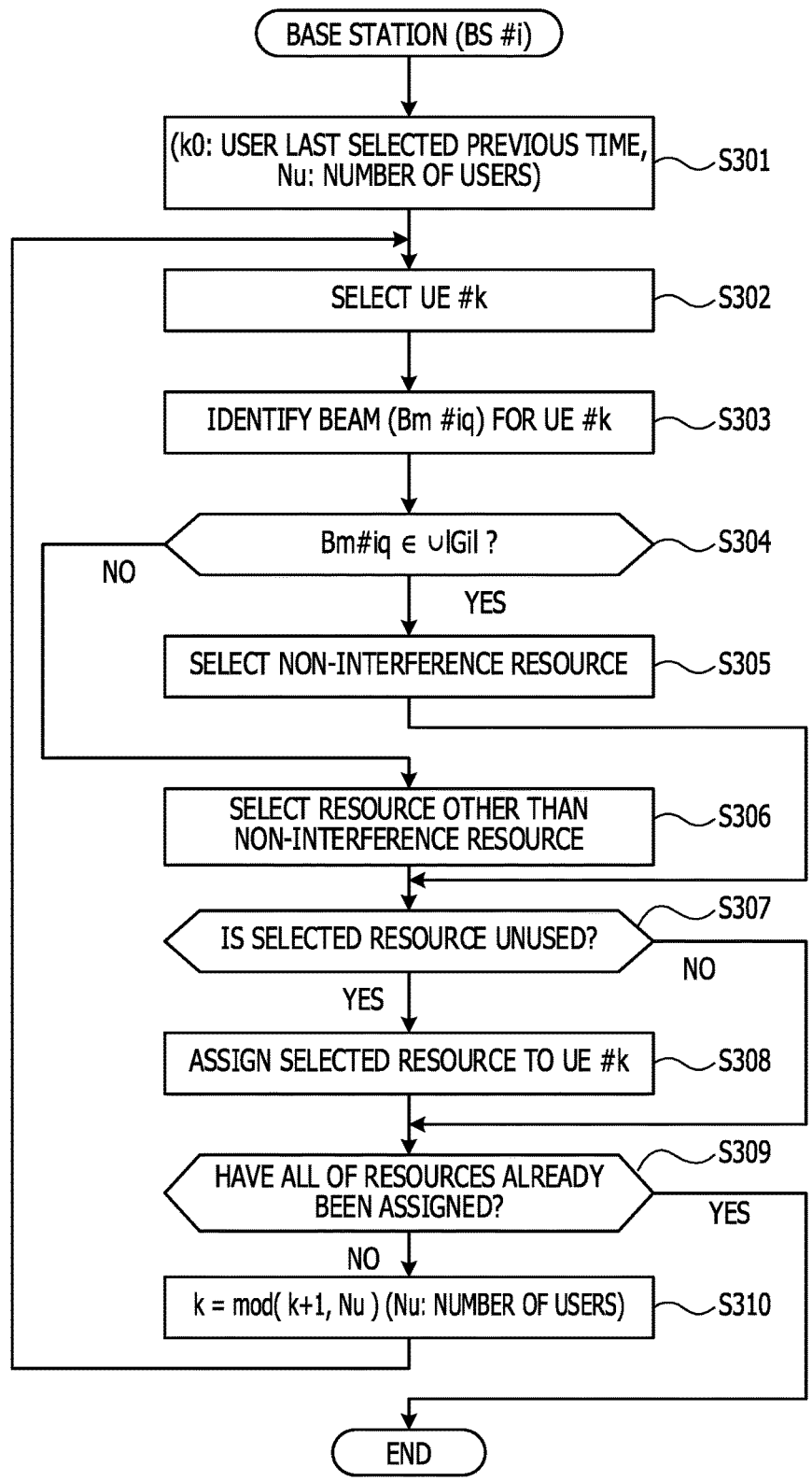
FIG. 18 is a flowchart illustrating a flow of processing related to assignment of resources, the processing being performed by a base station according to the second embodiment.

The following description will be made of processing of assigning resources to radio terminals in the case where non-interference resource sets are used. FIG. 18 is a flowchart illustrating a flow of processing related to assignment of resources, the processing being performed by a base station according to the second embodiment. The base station described with reference to FIG. 18 may be the base station 201, 202 or 203 illustrated in FIG. 2. Incidentally, the processing at BS #i will be described as an example. In addition, suppose that BS #i has already received the information on $\cup_l$Gil from the control station 300.

(S301)

The user selecting unit 214a sets a user index k to mod (k0+1, Nu). k0 denotes the user index of a radio terminal last selected by BS #i in a previous time slot. Incidentally, Nu is the number of radio terminals (number of users) present within the cell of BS #i.

(S302)

The user selecting unit 214a selects a radio terminal (UE #k) having the user index selected in S301.

(S303) The assignment beam determining unit 214c identifies a beam (Bm #iq) for UE #k. For example, the assignment beam determining unit 214c identifies a beam whose reception power value is a maximum at UE #k.

(S304)

The resource assigning unit 214d determines whether or not the beam Bm #iq selected in S303 is included in $\cup_l$Gil (I≠i). When the beam Bm #iq is included in $\cup_l$Gil, the processing proceeds to S305. When the beam Bm #iq is not included in $\cup_l$Gil, on the other hand, the processing proceeds to S306.

(S305)

The resource assigning unit 214d selects a non-interference resource set for UE #i. When the processing of S305 is completed, the processing proceeds to S307.

(S306) The resource assigning unit 214d selects a usable radio resource other than the non-interference resource set for UE #i.

(S307)

The resource assigning unit 214d determines whether or not the radio resource selected in S305 or S306 (selected resource) is unused (not assigned to another radio terminal). When the selected resource is unused, the processing proceeds to S308. When the selected resource is not unused, on the other hand, the processing proceeds to S309.

(S308)

The resource assigning unit 214d assigns the selected resource to UE #k.

(S309) The resource assigning unit 214d determines whether or not all of assignable radio resources have already been assigned. When all of the radio resources have already been assigned, the series of processing illustrated in FIG. 18 is ended. When there is an unassigned radio resource, on the other hand, the processing proceeds to S310.

(S310)

The resource assigning unit 214d resets the user index k to mod (k+1, Nu). Incidentally, mod denotes modulo arithmetic. In addition, Nu is the number of radio terminals (number of users) present within the cell of BS #i. When the processing of S310 is completed, the processing proceeds to S302.

As described above, based on a group of beams causing a strong interference between cells, non-interference resources are assigned to the beams included in the group. Inter-cell interference may be thereby suppressed. In addition, each base station refers to beam group information already obtained from the control station 300, and determines the assignment of the non-interference resources. Therefore inter-cell interference may be suppressed without channel information or the like being obtained from adjacent cells at a time of beamforming.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
    a memory that stores information on a strength of interference between a beam output by a first base station and a beam output by a second base station for each of a plurality of combinations, each of the plurality of combinations including at least one of a plurality of beams output by the first base station and at least one of a plurality of beams output by the second base station, emitting directions of each of the plurality of beams output by the first base station being different each other, emitting directions of each of the plurality of beams output by the second base station being different each other; and
    a processor coupled to the memory and the processor configured to:
        identify one or more combinations having the interference strength higher than a threshold value among the plurality of combinations; and
        assign different radio resources to each of beams included in the identified one or more combinations.

2. The radio communication device according to claim 1, wherein
    the processor is further configured to:
        notify information on the assigned radio resources to the first base station and the second base station.

3. The radio communication device according to claim 1, wherein
    the threshold value is determined based on an evaluation value indicating an evaluation that becomes higher as a ratio between a number of combinations having interference strengths higher than the threshold value and a number of combinations having interference strengths not higher than the threshold value approaches a fixed value.

4. The radio communication device according to claim 1, wherein
    the information on the strength of the interference includes a second correlation value obtained by subjecting first correlation values to statistical processing with respect to a plurality of mobile stations, the first correlation values indicating strengths of interference between the beams received by each of the plurality of mobile stations from the first base station and the second base station.

5. A radio communication system comprising:
    a first base station;
    a second base station; and
    a radio communication device including:
        a memory that stores information on a strength of interference between a beam output by the first base station and a beam output by the second base station for each of a plurality of combinations, each of the plurality of combinations including at least one of a plurality of beams output by the first base station and at least one of a plurality of beams output by the second base station, emitting directions of each of the plurality of beams output by the first base station being different each other, emitting directions of each of the plurality of beams output by the second base station being different each other; and
        a processor coupled to the memory and the processor configured to:
            identify one or more combinations having the interference strength higher than a threshold value among the plurality of combinations; and
            assign different radio resources to each of beams included in the identified one or more combinations.

6. A beam control method executed by a computer, the beam control method comprising:
    obtaining information on a strength of interference between a beam output by a first base station and a beam output by a second base station for each of a plurality of combinations, each of the plurality of combinations including at least one of a plurality of beams output by the first base station and at least one of a plurality of beams output by the second base station, emitting directions of each of the plurality of beams output by the first base station being different each other, emitting directions of each of the plurality of beams output by the second base station being different each other;
    identifying one or more combinations having the interference strength higher than a threshold value among the plurality of combinations; and
    assign different radio resources to each of beams included in the identified one or more combinations.

* * * * *